(12) United States Patent
Hurst et al.

(10) Patent No.: US 7,808,131 B2
(45) Date of Patent: Oct. 5, 2010

(54) PRECISION BATTERY PACK CIRCUITS

(75) Inventors: Aeron Hurst, San Marcos, TX (US); Carlos Coe, San Marcos, TX (US); Mark Hood, New Braunfels, TX (US)

(73) Assignee: Xtreme Power Inc., Kyle, TX (US)

( * ) Notice: Subject to any disclaimer, the term of this patent is extended or adjusted under 35 U.S.C. 154(b) by 919 days.

(21) Appl. No.: 11/549,013

(22) Filed: Oct. 12, 2006

(65) Prior Publication Data

US 2008/0090139 A1 Apr. 17, 2008

(51) Int. Cl.
*H02J 7/00* (2006.01)
(52) U.S. Cl. ........................................... 307/150
(58) Field of Classification Search ............... 307/150
See application file for complete search history.

(56) References Cited

U.S. PATENT DOCUMENTS

| | | | |
|---|---|---|---|
| 4,658,623 A | 4/1987 | Blanyer et al. |
| 4,865,933 A | 9/1989 | Blanyer et al. |
| 4,909,955 A | 3/1990 | Morris et al. |
| 4,964,878 A | 10/1990 | Morris |
| 5,010,637 A | 4/1991 | Blanyer et al. |
| 5,173,652 A | 12/1992 | Henkel |
| 5,409,787 A | 4/1995 | Blanyer et al. |
| 5,696,526 A | 12/1997 | Kanbe et al. |
| 5,701,068 A | 12/1997 | Baer et al. |
| 5,925,470 A | 7/1999 | Blanyer et al. |
| 6,027,822 A | 2/2000 | Blanyer et al. |
| 6,074,774 A | 6/2000 | Semmens et al. |
| 6,356,051 B1 | 3/2002 | Hasunuma et al. |
| 6,504,342 B2 * | 1/2003 | Inui et al. ................. 320/112 |
| 6,932,651 B2 | 8/2005 | Mita et al. |
| 6,935,020 B2 | 8/2005 | Ikeda |
| 2001/0052837 A1 | 12/2001 | Walsh |
| 2002/0171390 A1 | 11/2002 | Kruger et al. |
| 2005/0031945 A1 | 2/2005 | Morita et al. |
| 2005/0269995 A1 | 12/2005 | Donnelly et al. |
| 2008/0124617 A1 * | 5/2008 | Bjork ......................... 429/90 |

FOREIGN PATENT DOCUMENTS

| | | |
|---|---|---|
| EP | 1689 009 A | 8/2006 |
| WO | WO 99/00858 | 1/1999 |

OTHER PUBLICATIONS

International Search Report and Written Opinion PCT US2007/081082—Mailed Sep. 11, 2008, 11 pages.

* cited by examiner

*Primary Examiner*—Robert L. Deberadinis
(74) *Attorney, Agent, or Firm*—Fish & Richardson P.C.

(57) ABSTRACT

A battery pack connection scheme is shown that provides an synchronized DC environment for every cell in the pack, such that every cell in the same or similar voltage level in the pack sees exactly the same voltage and current environment. In some embodiments, a pack is provided having a positive load connection terminal and multiple batteries connected in parallel to the terminal. The connections are made via respective conductive paths each including a high-power DC precision cable segment, each of the conductive paths having a resistance suitable to allow an average charge acceptance rate of the battery pack to be greater than a one-hour, or "C1", charge rate. The precision cable segments preferably have matching impedances, or have matching DC resistances.

28 Claims, 28 Drawing Sheets

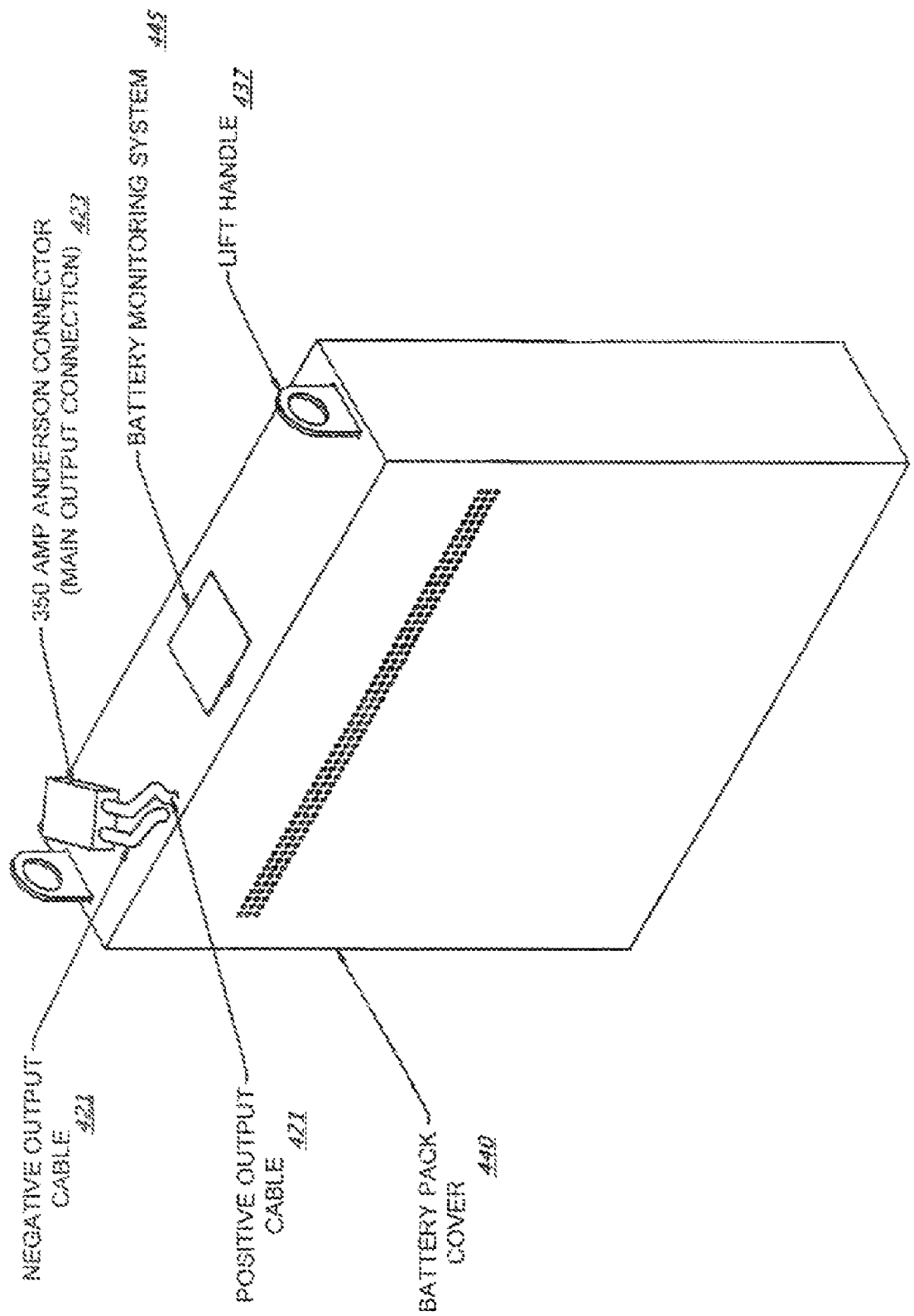

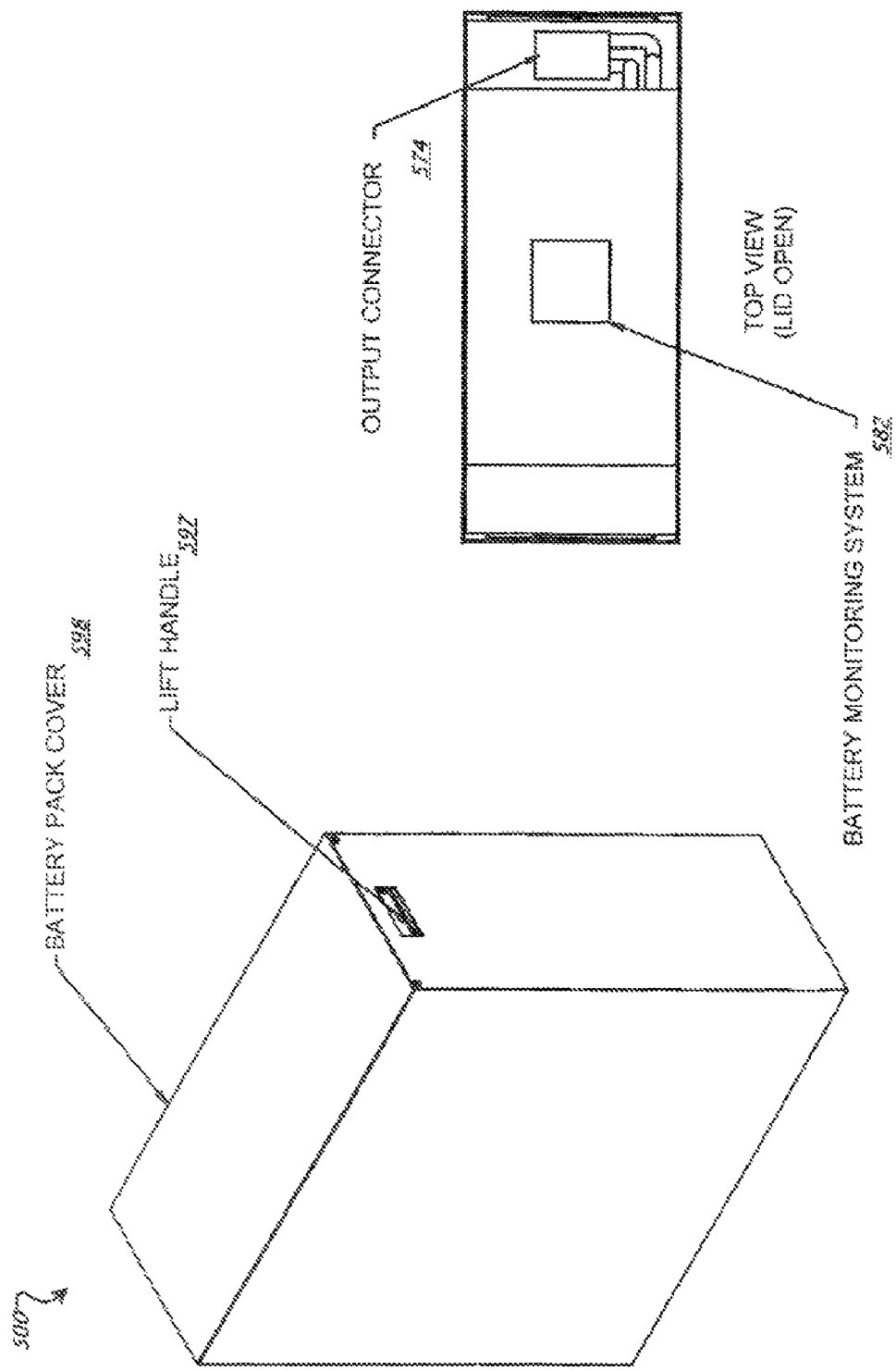

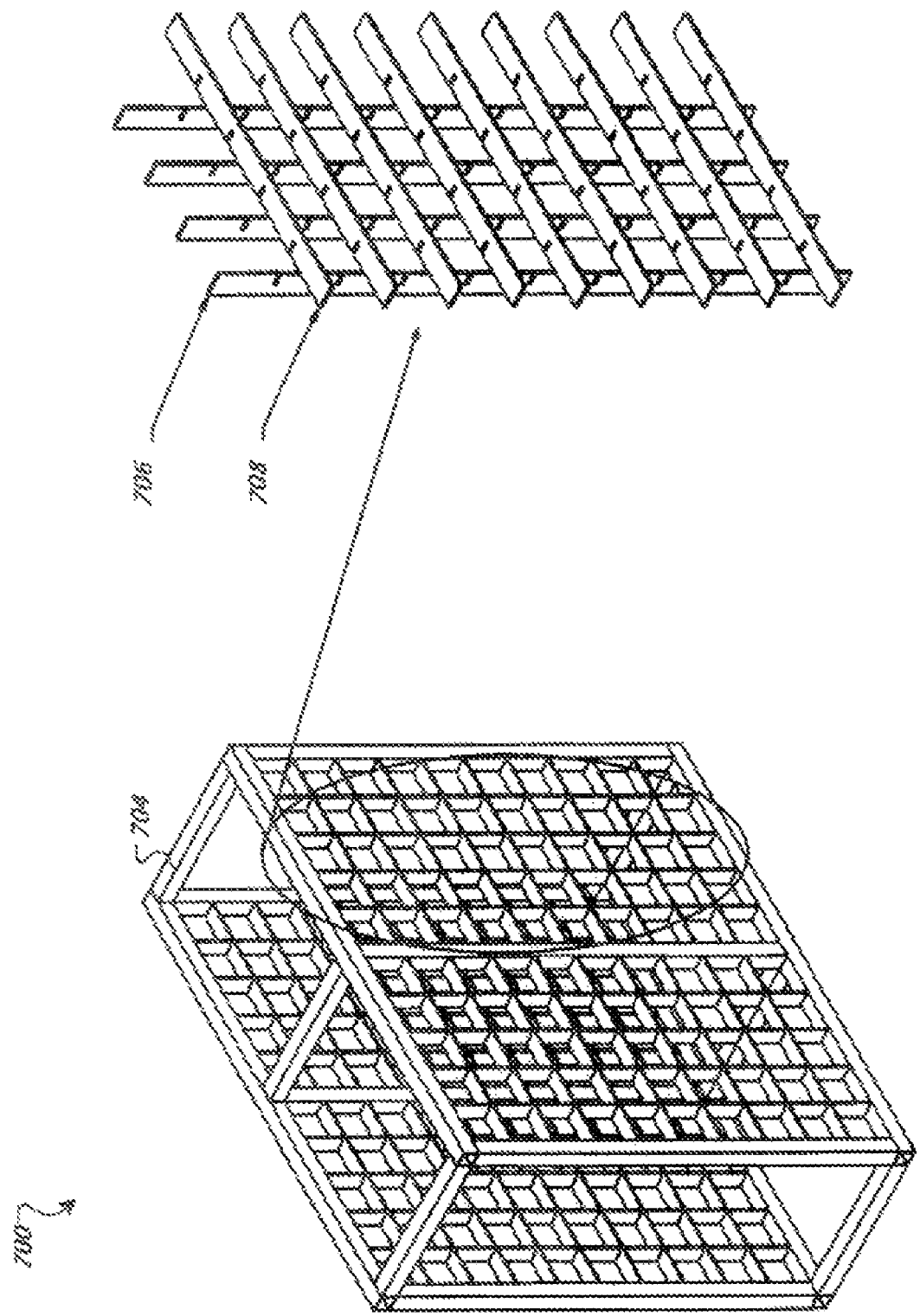

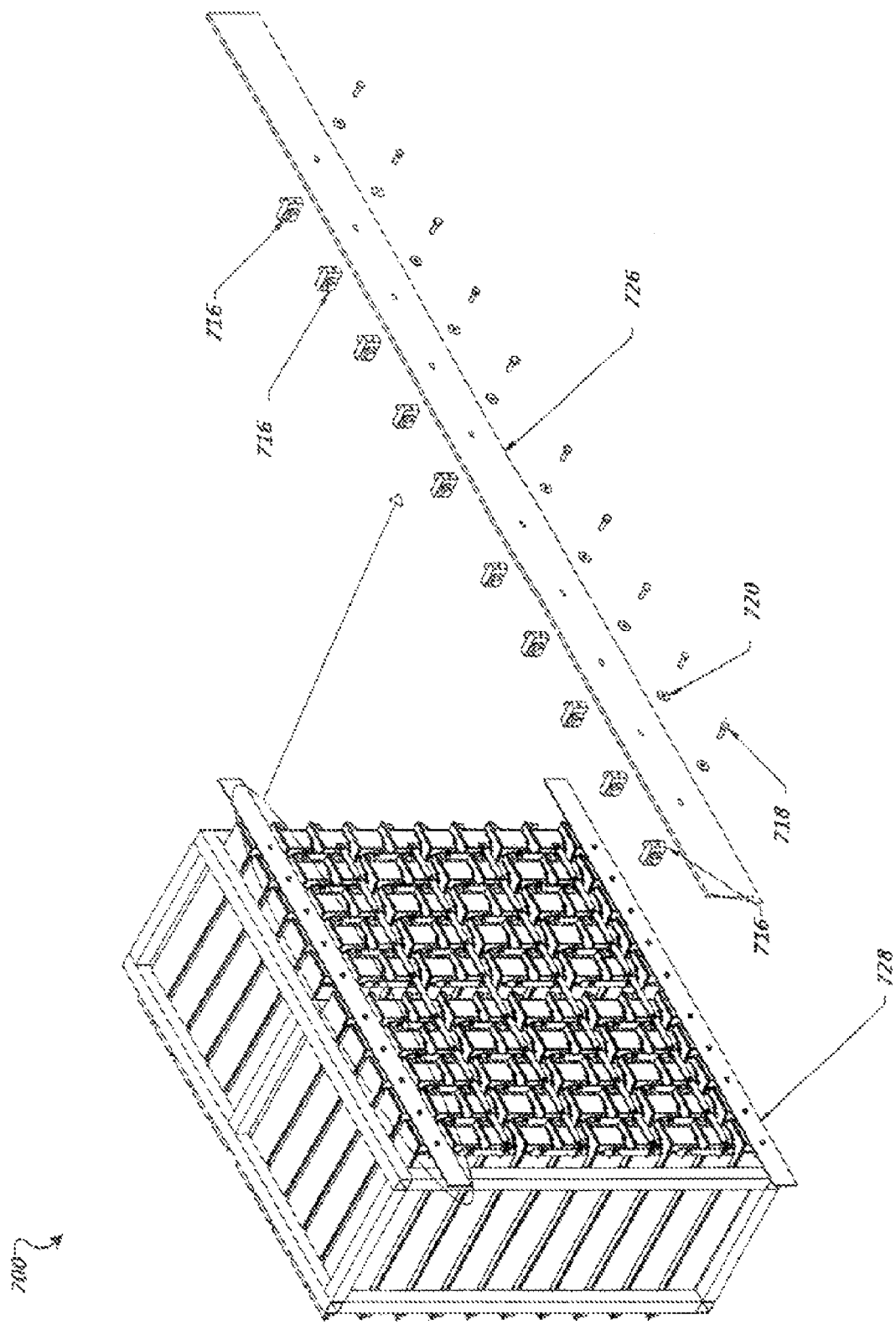

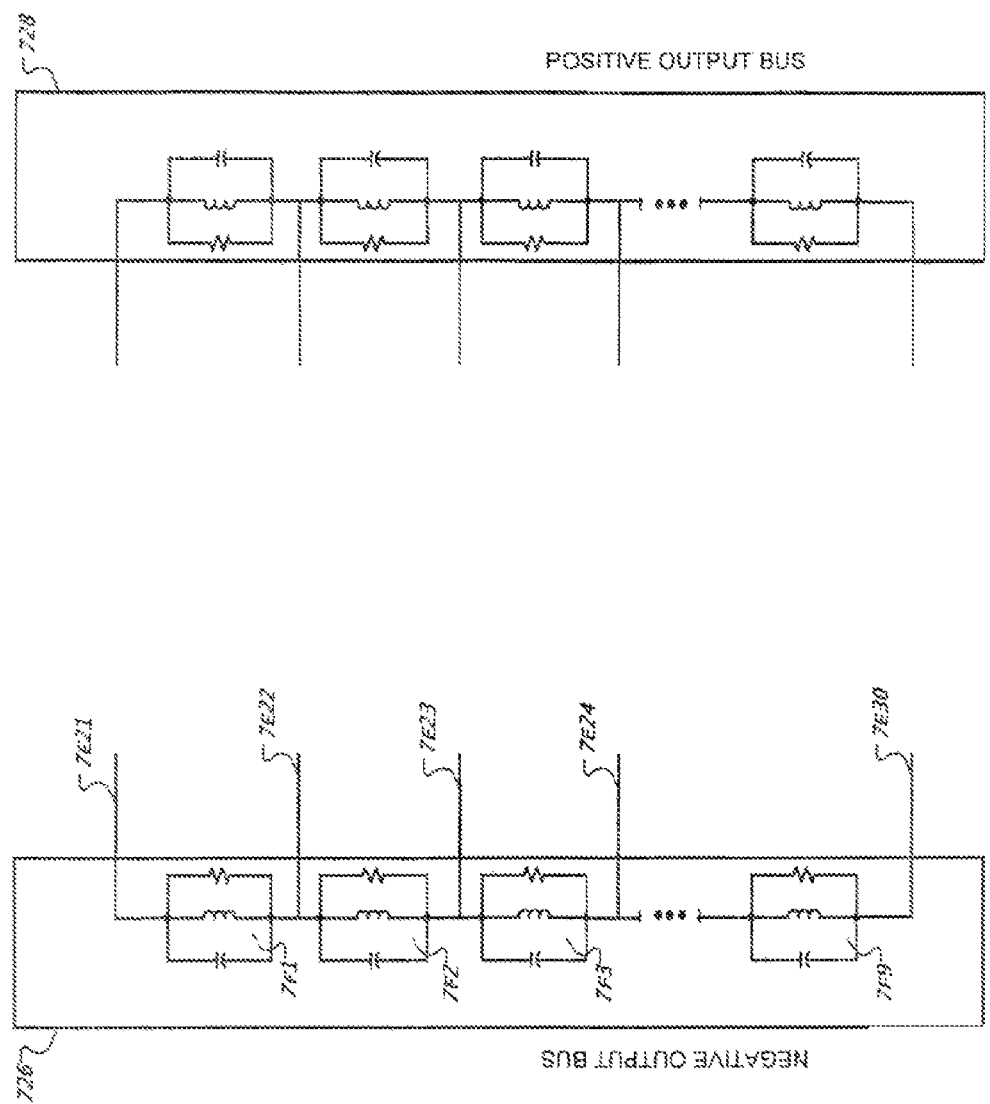

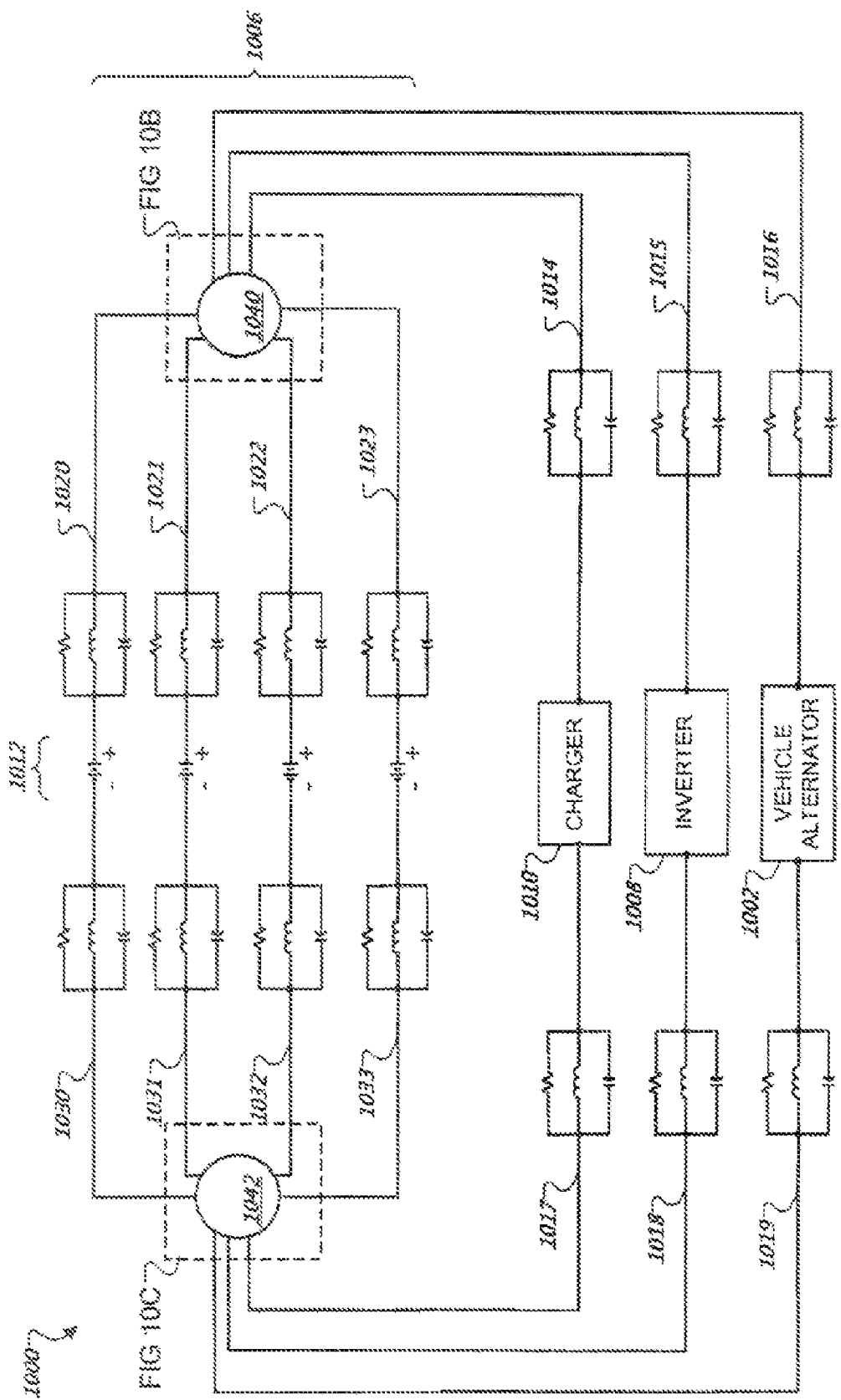

PRECISION BATTERY PACK CIRCUITS

TECHNICAL FIELD

This invention relates to power supplies, and more particularly to battery packs or battery power systems with multiple battery units, and their associated wiring, charging, and discharging.

BACKGROUND

A typical battery pack is characterized by having more than one battery cell. Such packs do not perform, have the same operating characteristics, or life cycle as individual cells. A cell is a single battery unit. During charge and discharge cycles, individual batteries in the pack will often diverge or drift from the pack average or pack target value. Often the pack performance is limited by the weakest or strongest cell during discharge and recharge.

In order to achieve acceptable performance, most battery packs require frequent conditioning cycles and/or an active battery management system. Conditioning cycles bring the pack slowly up to full charge which attempts to equalize the state of the batteries in the pack. To equalize batteries means to reduce the gap between the weakest and strongest cell. Active battery management addresses this issue by providing a small localized charge or discharge across individual cells. Active battery management keeps the strongest and weakest cells closer to the average cell. This results in better pack performance but still well under the performance of an individual cell. Conditioning cycles are still required, but not as often as a pack without a battery management system.

A typical battery management system uses electronic devices such as thermistors or transistors in series or parallel with each cell to locally control the charge or discharge of the cell. Such systems typically dissipate extra power, limit pack capacity, and add expense to pack design and production. This is especially true for large, high power battery packs.

What is needed are circuits and methods to combine battery cells in high power battery packs or power supply systems to improve capacity, charge and discharge rates, lifespan, and other performance characteristics.

SUMMARY

In order for a pack to perform at an optimum condition, each cell is connected in a pack configured to provide the same DC environment as the any other cell in the pack. A battery pack connection scheme is shown that provides a synchronized DC environment for every cell in the pack, such that every cell in the same or similar voltage level in the pack sees an identical, or very similar, voltage and current environment.

In some embodiments, a pack is provided having a positive load connection terminal and multiple batteries connected in parallel to the terminal. The connections are made via respective conductive paths each including a high-power DC precision cable segment, each of the conductive paths having a low resistance suitable to allow a high charge or discharge rate of the battery pack. The precision cable segments preferably have matching impedances, or have matching DC resistances. This may be achieved by precisely matching the cable lengths. Connections and fittings to the battery terminals and to the positive load connection terminal are also preferably precision matched to each other. One or more additional parallel-connected sets of batteries may be connected in series with the above set. The parallel connections are preferably made with matching conductors. One preferred construction of conductive fittings and electrical busses includes silver-plated soft copper.

In some embodiments, a battery pack is provided having a positive load connection terminal with batteries connected to it with parallel conductive paths, each path having an under-load resistance differing from that of the of other parallel conductive paths by less than about 1 milli-ohm, and in some implementations having very low impedance precision DC cabling, the under load resistance differs by less than about 5% and in some embodiments less than 1%. The conductive paths may include cables and a respective conductive portion of a terminal bus. The cables may be connected to the terminal bus at equal spacing, thereby providing equal resistive paths between them. One such connection arrangement is done on a circular terminal bus having the positive load connection terminal coupled at its center. In some embodiments, the loaded series impedance of the batteries is as similar as possible, and the loaded series impedance of the parallel conductive paths is similar to or less than that of the batteries.

Various embodiments may have multiple rows of parallel-connected batteries arranged in a series to provide higher output voltage. Similar parallel conductive arrangements may be made at the positive and negative ends of such a matrix.

In some embodiments, the batteries are low-impedance batteries allowing fast charging and discharging. Some embodiments employ high performance batteries having an open circuit resistance of about 1-2 milli-ohms. Batteries are preferably selected to have, as closely as possible, identical electrical properties. External compression cages may be used to ensure that batteries to conform their physical and electrical characteristics to a certain standard, or to prevent swelling of batteries that may deleteriously effect their chemistry. Capacitors or other suitable energy storage units (power cells) may be substituted for batteries in some embodiments. In some implementations, the circuit arrangement described herein may also connect active power supply circuits such as chargers or voltage supplies.

In still other embodiments, multiple battery units are connected in parallel to supply energy to a high-power load. The parallel connection is made with a precision conductive assembly being adapted to passively prevent voltage divergence of the multiple battery units. The precision conductive assembly may also be adapted to passively prevent battery capacity divergence. In some embodiments the precision conductive assembly includes high power precision DC cables, in others it includes at least one busbar.

Another embodiment provides a battery pack comprising a multiple means for storing energy, and a connection means for electrically connecting the multiple means for storing energy together and preventing discharge-rate divergence during use.

Other aspects of the invention feature methods of mitigating battery characteristic divergence within a battery pack. One aspect includes choosing multiple batteries each having, as closely as possible, equal loaded output resistance and charge acceptance characteristics; connecting the multiple batteries in parallel in a battery pack; charging the multiple batteries simultaneously after connecting the multiple batteries in parallel; while charging the multiple batteries simultaneously, maintaining equal charging voltages across each of the multiple batteries; and while charging the multiple batteries simultaneously, maintaining equal charge-acceptance rates in each of the multiple batteries. Another aspect includes discharging the multiple parallel-connected batteries simultaneously into a load; while discharging the multiple batteries simultaneously, maintaining equal discharging voltages across each of the multiple batteries; and while discharging the multiple batteries simultaneously, maintaining equal discharge currents in each of the multiple batteries.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A-C show 12 volt battery pack with parallel batteries and precision conductors according to another implementation.

FIG. 4A illustrates the internals of the 12 volt battery pack.

FIG. 4B is a representation of the assembled 12 volt battery pack.

FIG. C is a circuit diagram of the 12 volt battery pack.

FIGS. 5A-D illustrate a 24-volt battery pack using precision conductors according to another implementation.

Figure 5A:
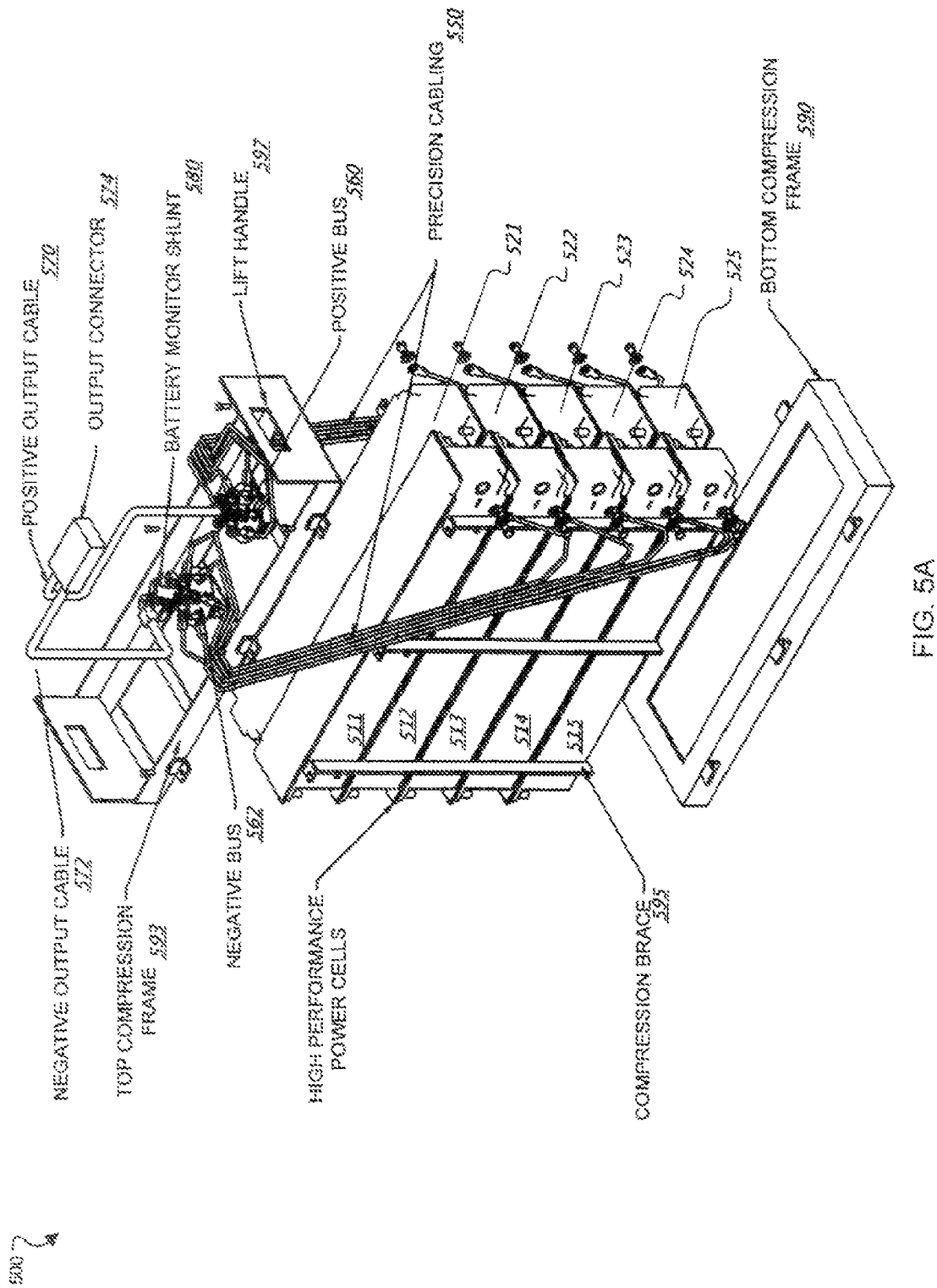

FIG. 5A illustrates the internals of the 24-volt battery pack.

Figure 5B:
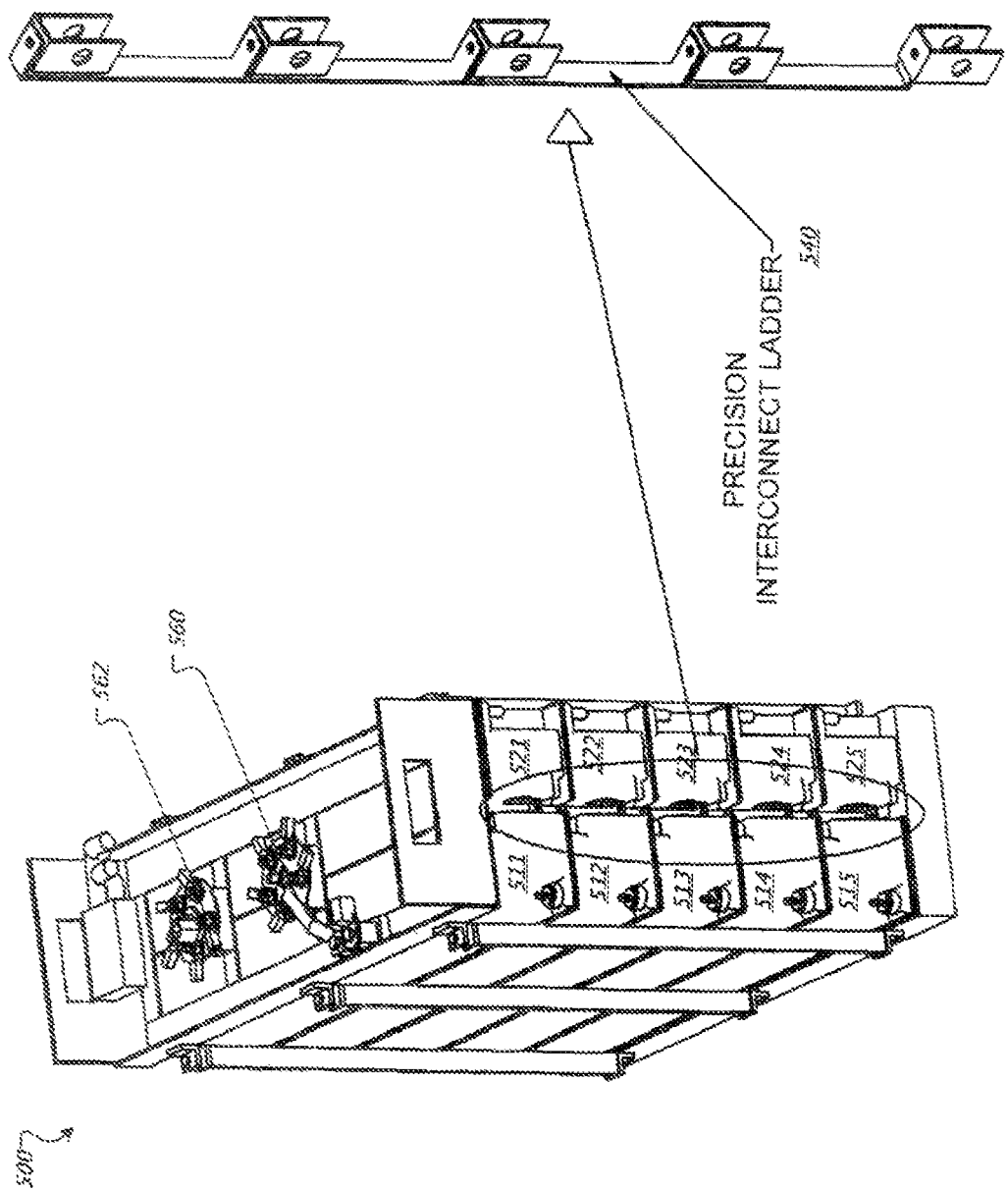

FIG. 5B is a representation of the assembled 24-volt battery pack.

FIG. 5C is a circuit diagram of the 24-volt battery pack.

Figure 5D:
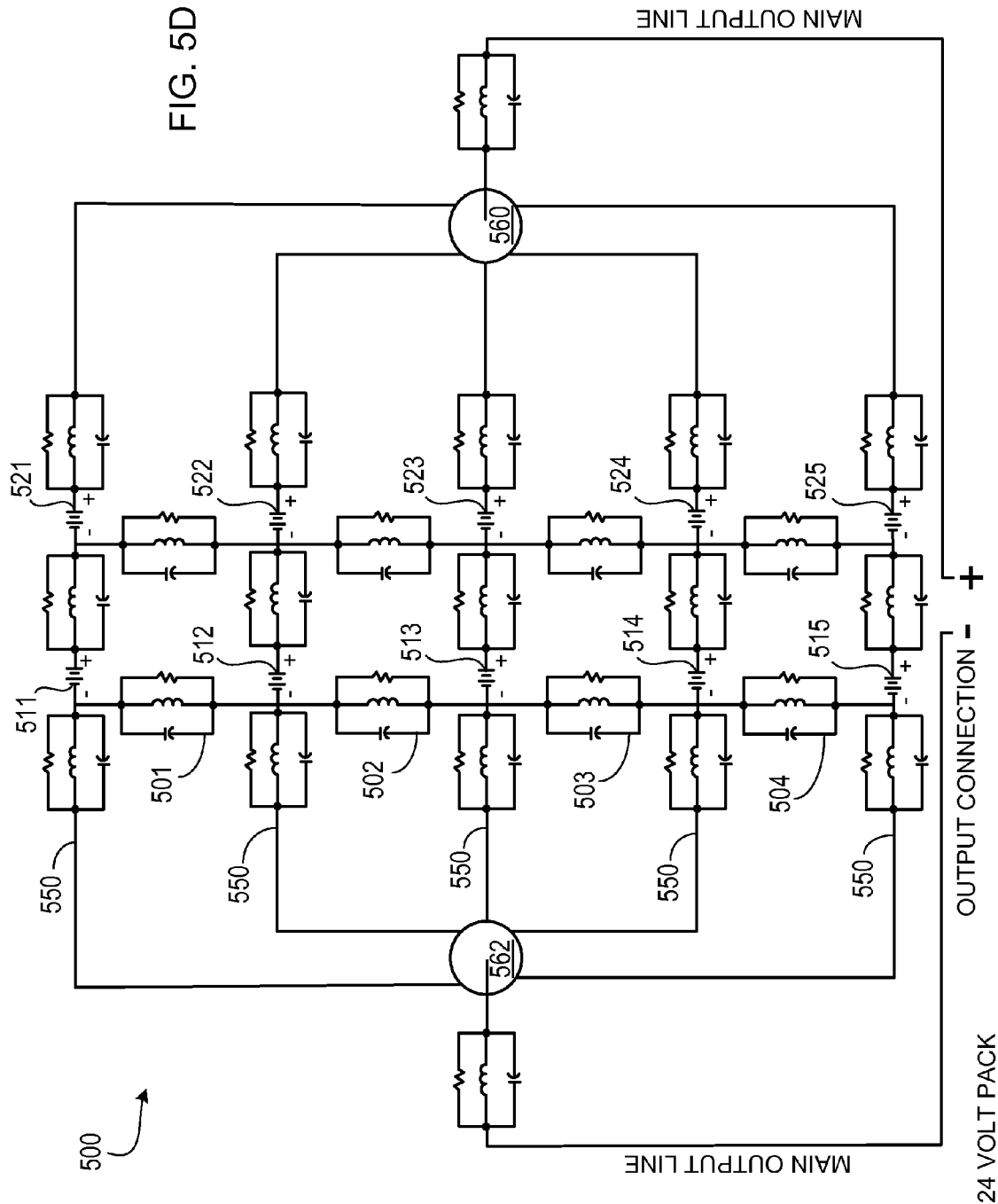

FIG. 5D is a circuit diagram of the 24-volt battery pack described above.

Figure 5E:
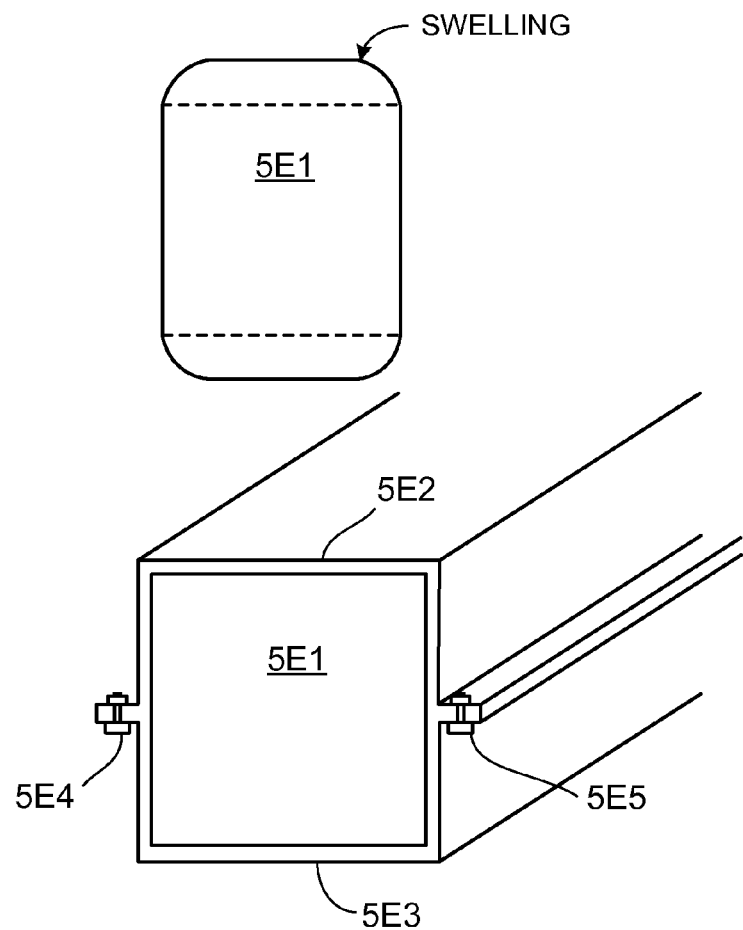

FIG. 5E depicts a battery compression cage.

Figure 6A:
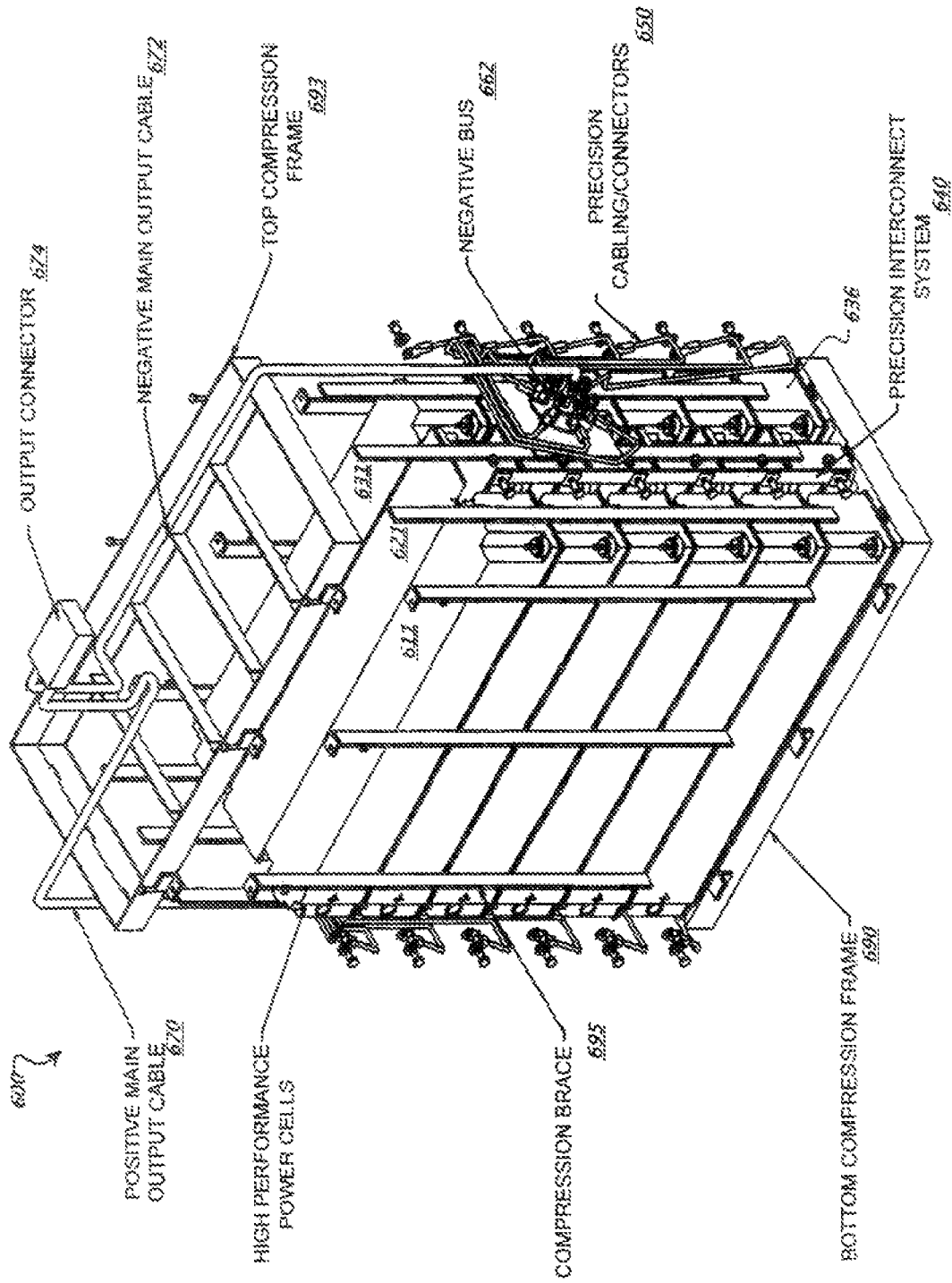
Figure 6B:
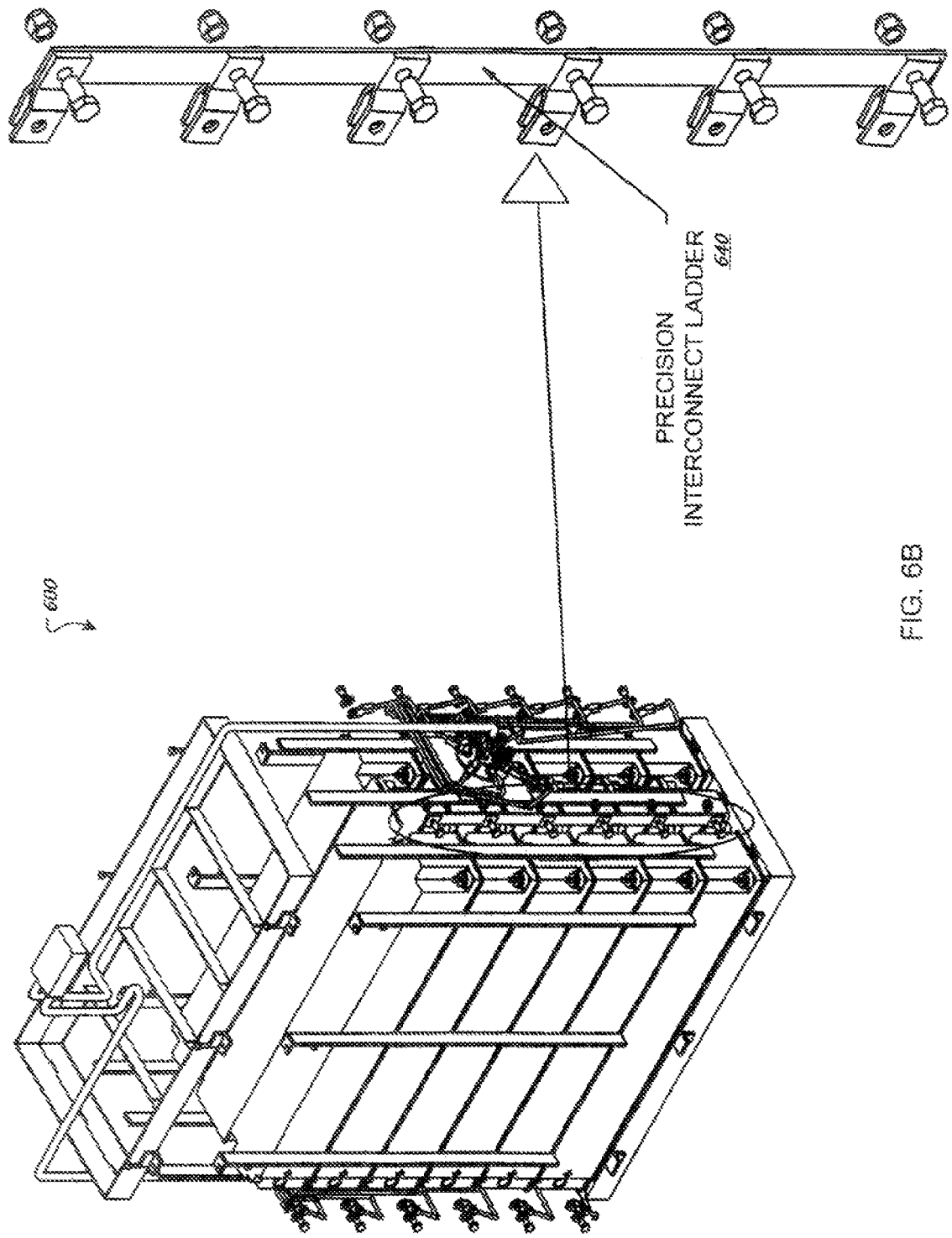
Figure 6C:
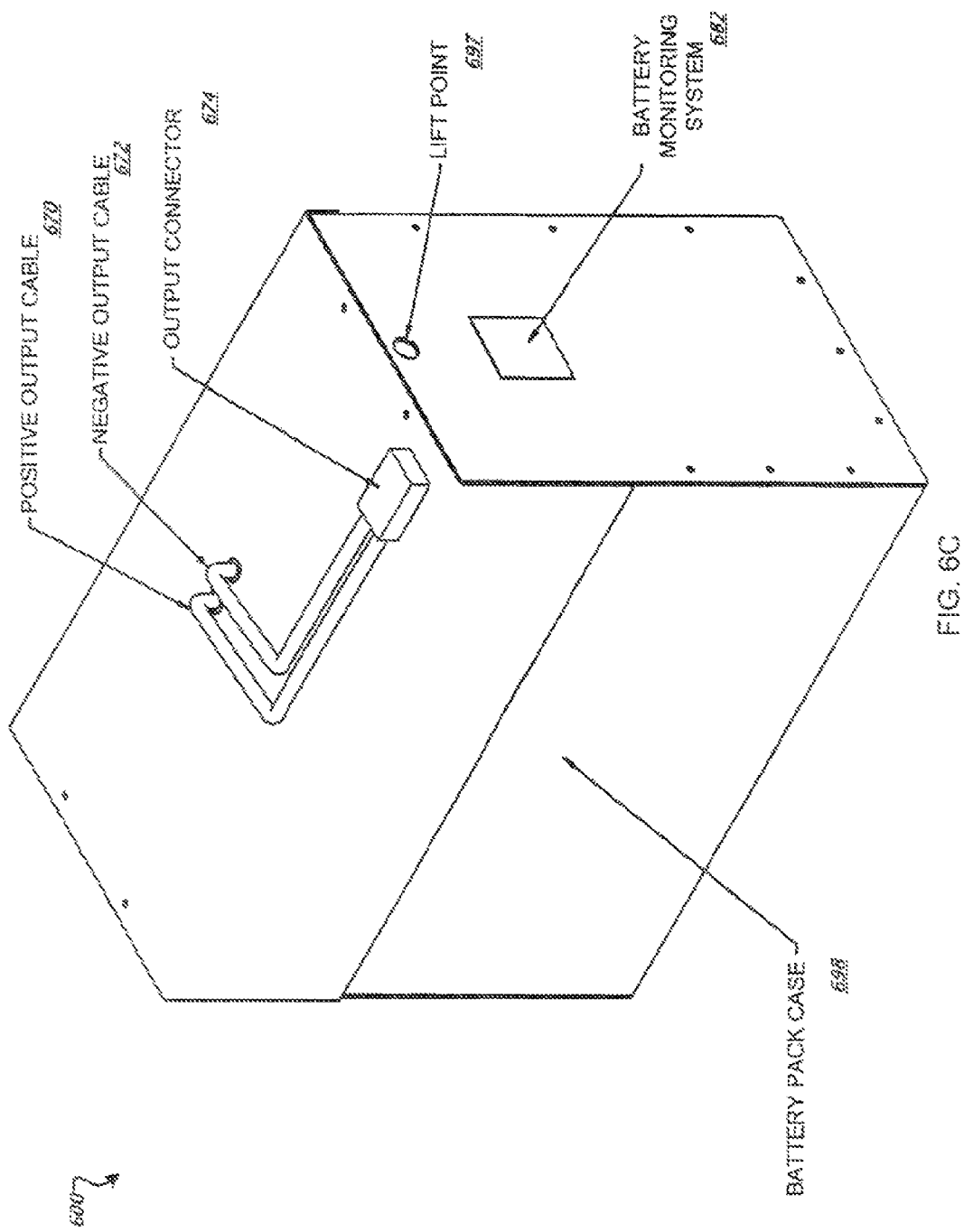

FIGS. 6A-C illustrate a 36-volt battery pack using precision conductors, similar to the battery pack described above in FIGS. 5A-D, with the addition of another column of power cells.

FIG. 6A depicts a perspective view.

FIG. 6B depicts an enlarged perspective of a precision conductive ladder.

FIG. 6C depicts a perspective view of a housing.

Figure 6D:
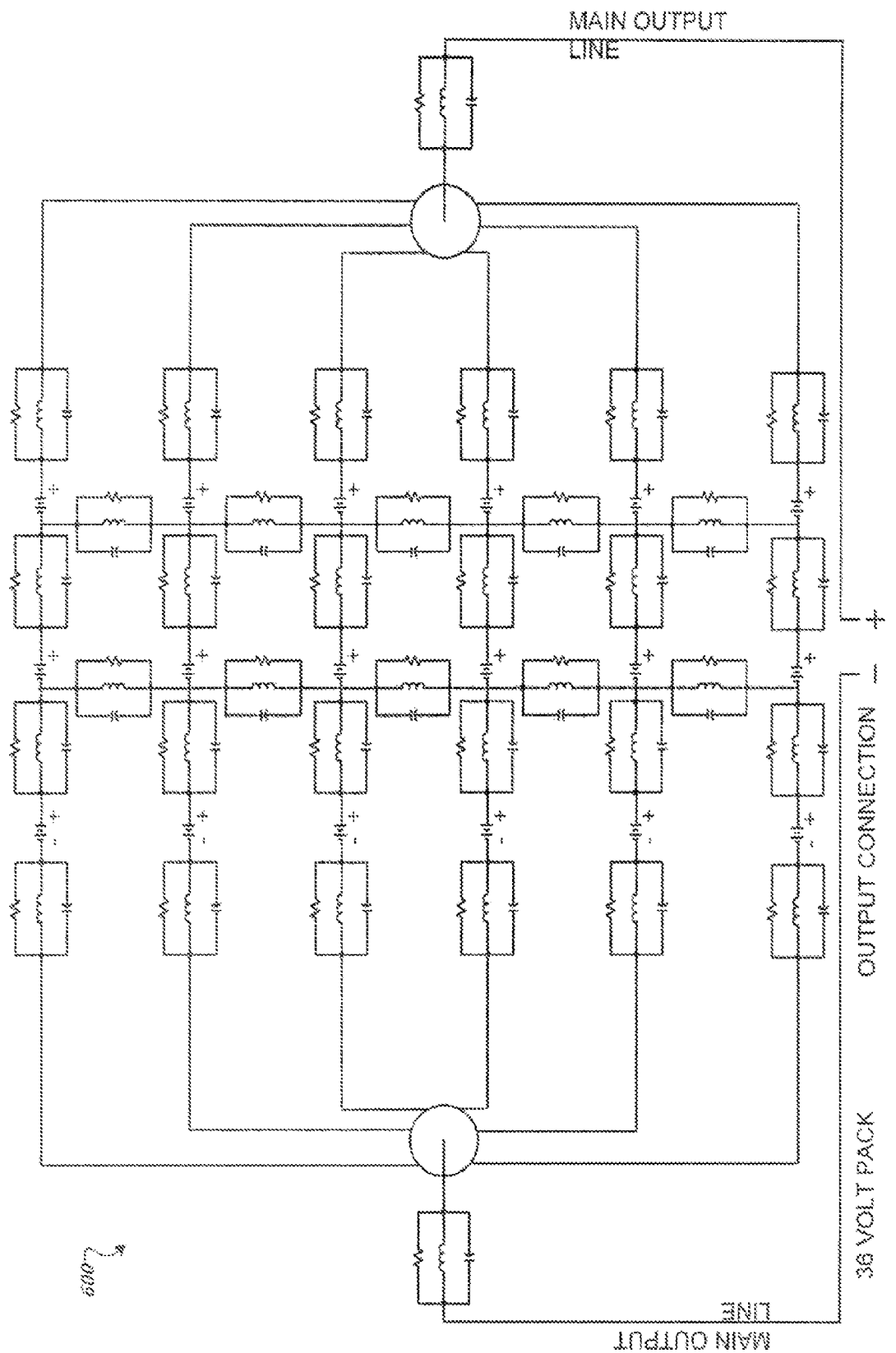

FIG. 6D is a circuit diagram of a 36V battery pack.

FIGS. 7A-D illustrate a high-power battery pack suitable for powering a remote installation.

Figure 7A:
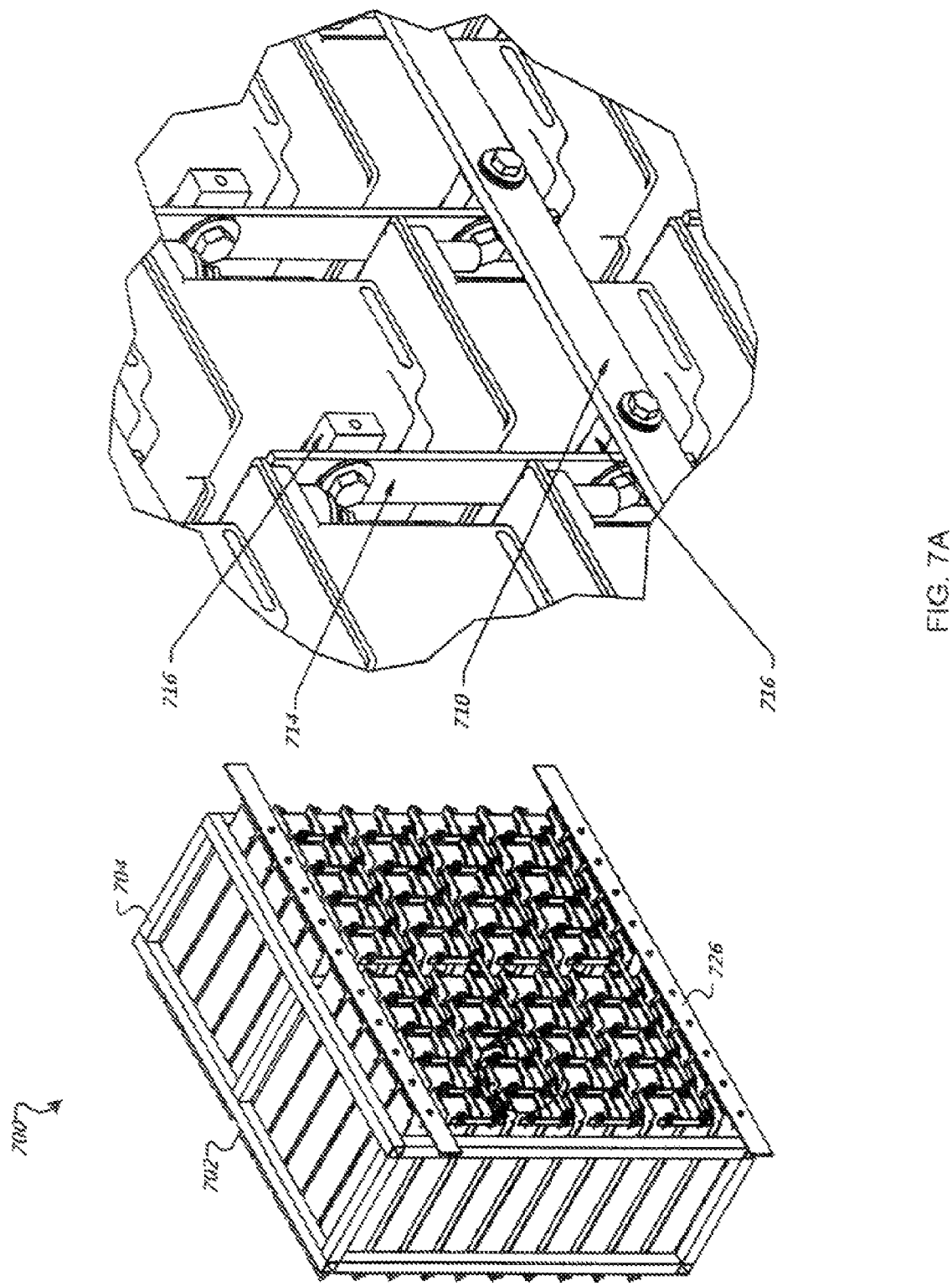

FIG. 7A depicts an enlarged perspective of battery interconnects.

FIG. 7B depicts a preferred lattice support frame.

Figure 7C:
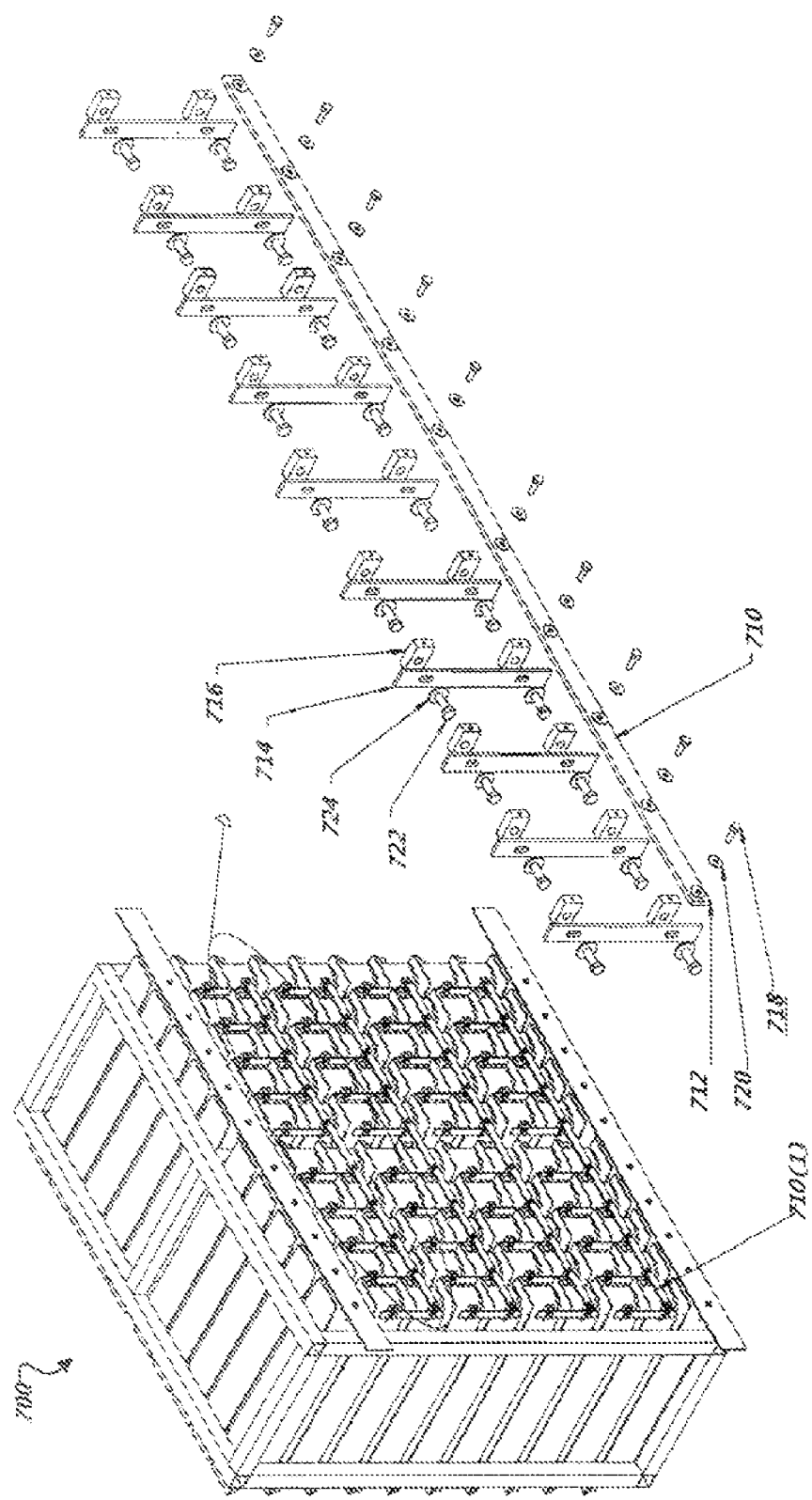

FIG. 7C depicts an enlarged perspective of a crossbar bus.

FIG. 7D depicts an enlarged perspective of an output bus.

Figure 7E:
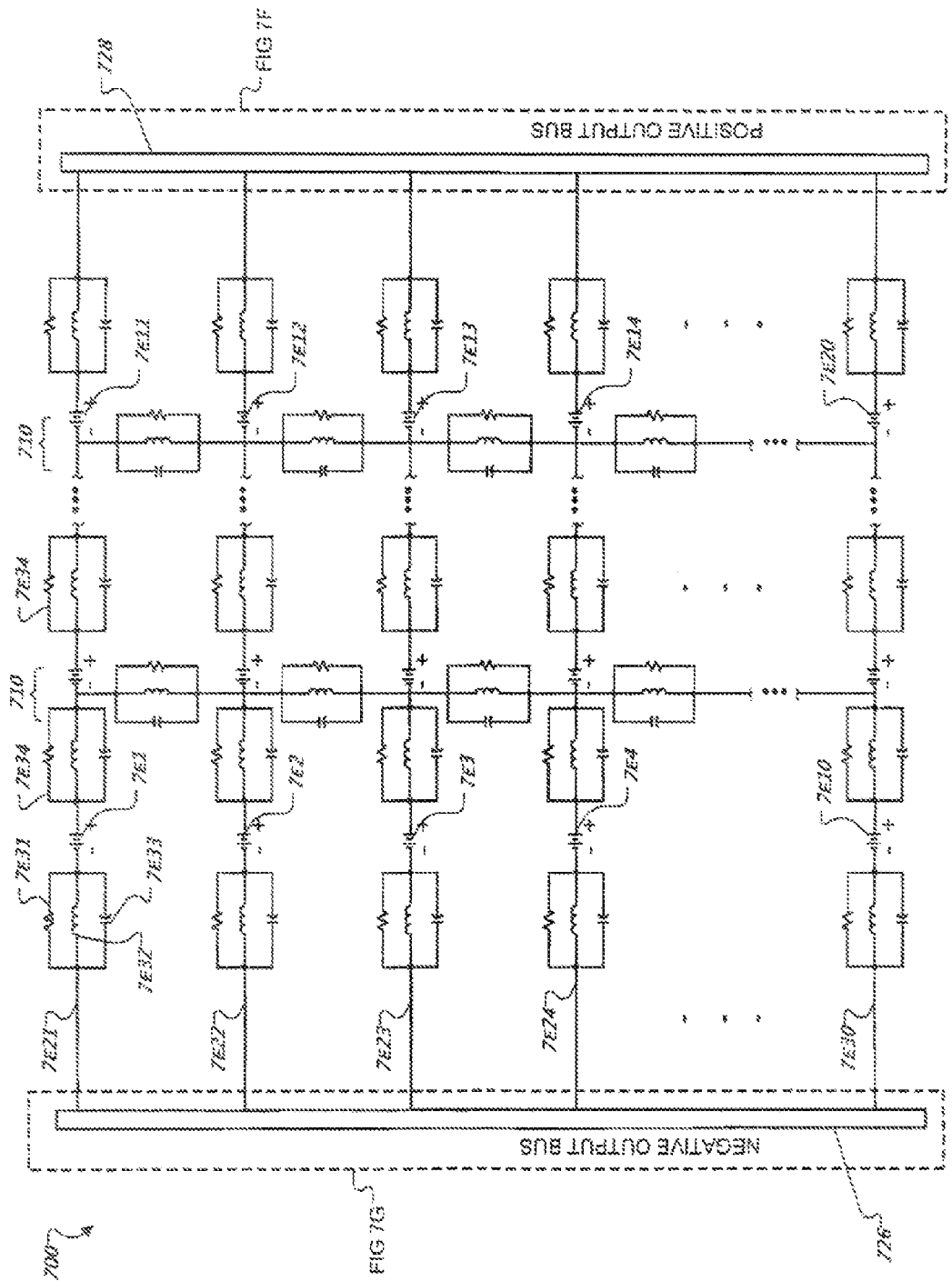

FIGS. 7E-G depicts a circuit equivalent to the battery pack depicted in FIGS. 7A-7D.

FIG. 7E is the pack circuit diagram.

FIG. 7F is detailed circuit diagram of an output bus.

FIG. 7G is another detailed circuit diagram of an output bus.

Figure 7H:
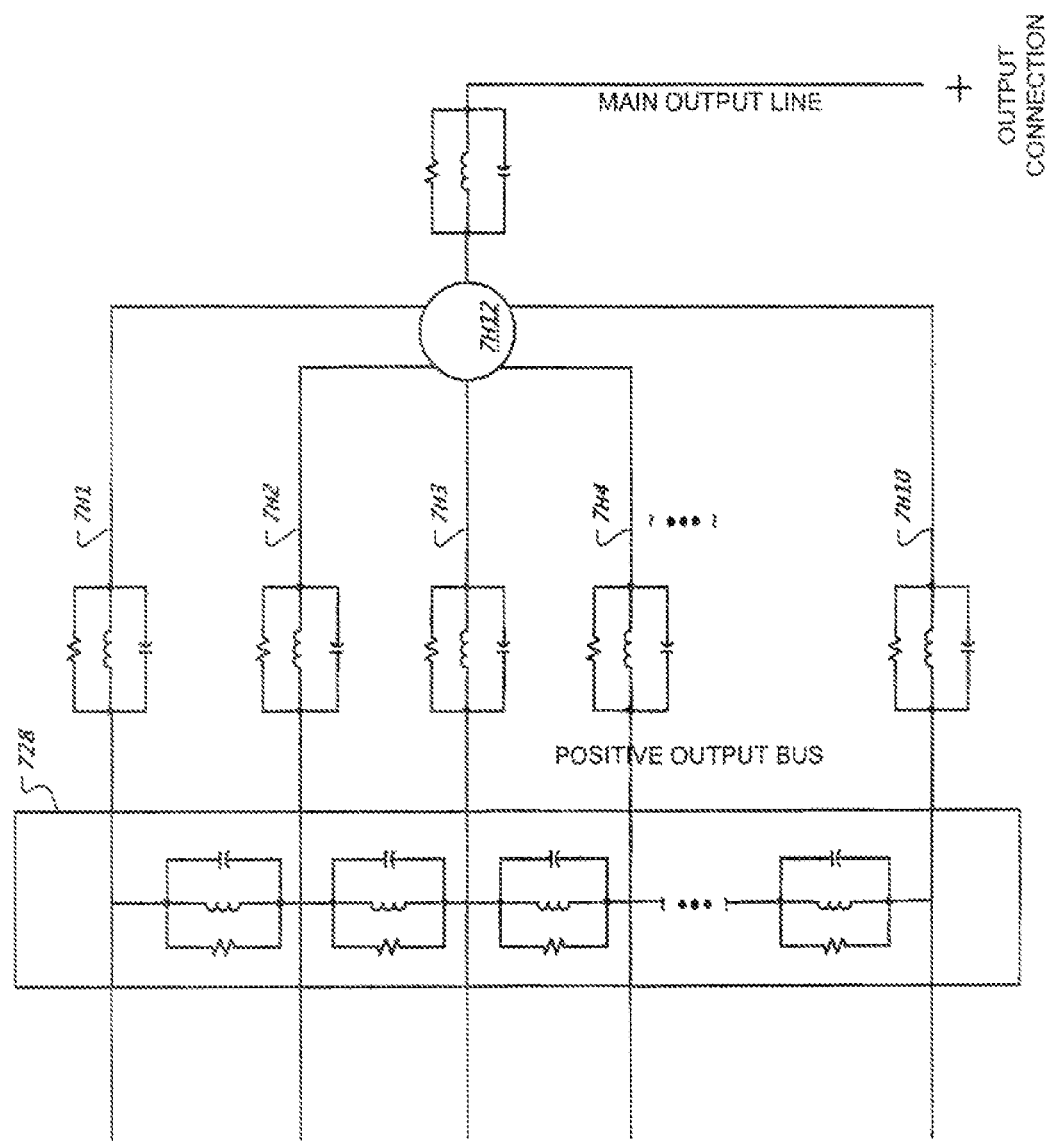

FIG. 7H depicts another output connection solution.

Figure 8:
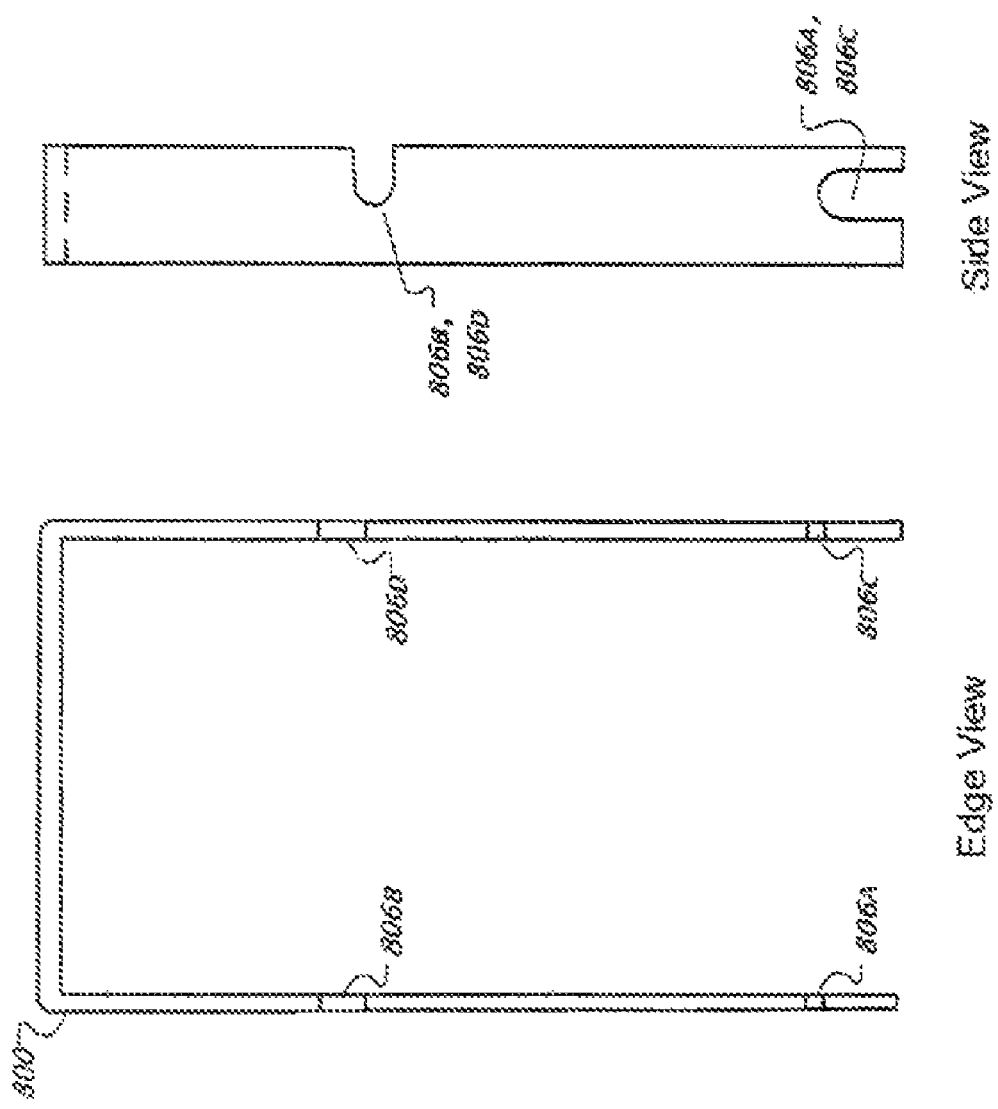

FIG. 8 shows an example of precision conductor configuration

Figure 9A:
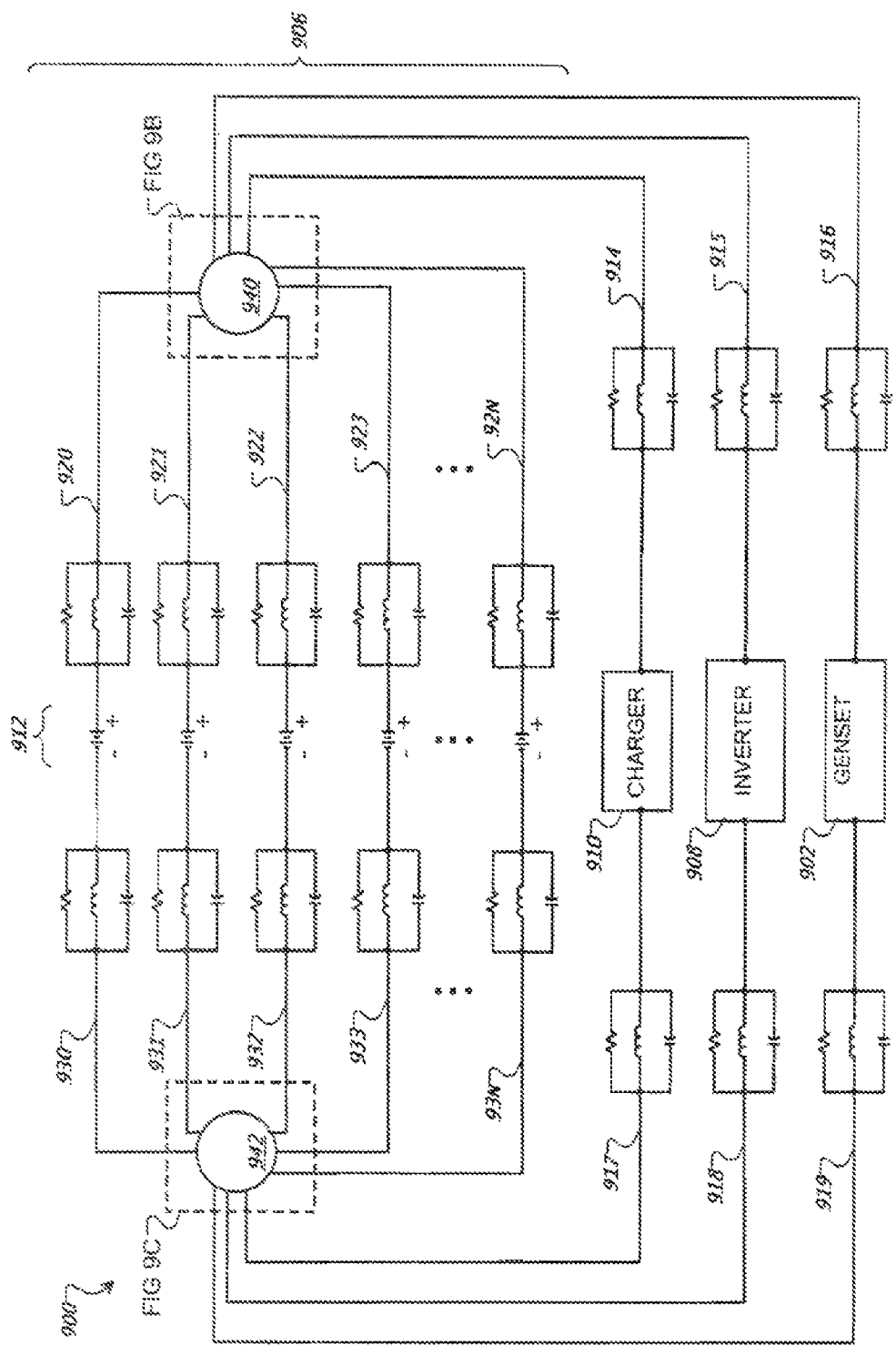
Figure 9C:
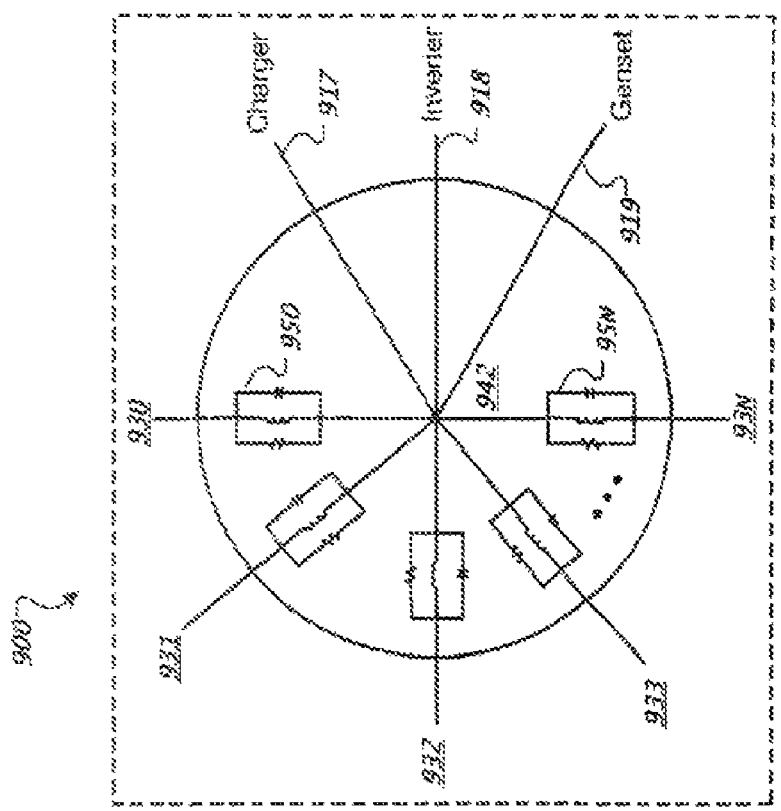
Figure 9B:
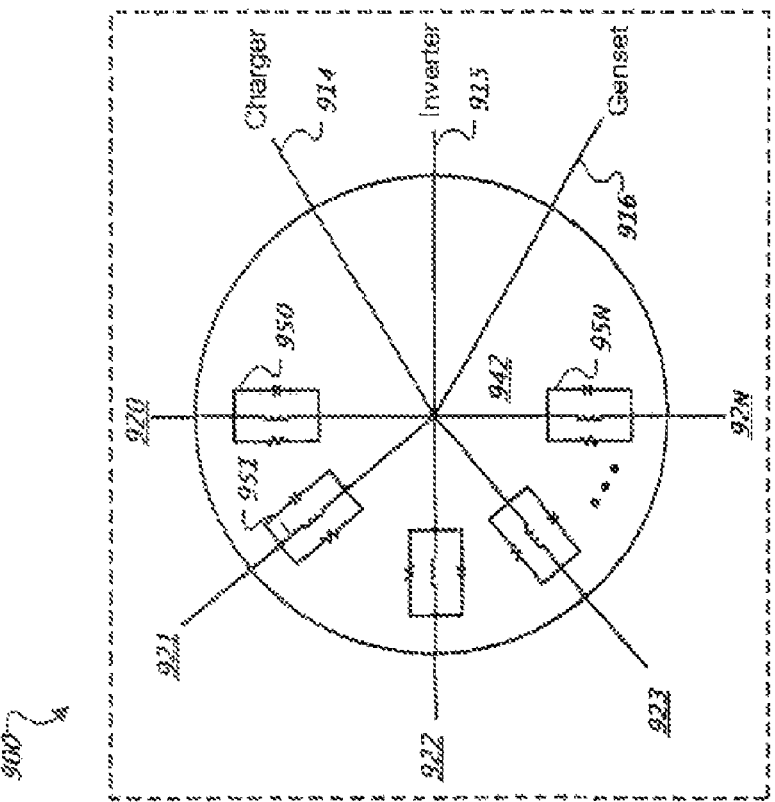

FIGS. 9A-C illustrate a circuit diagram of a system for providing electric power.

FIG. 9A is a circuit diagram of the power system.

FIG. 9B is a circuit diagram of a negative bus.

FIG. 9C is a circuit diagram of a positive bus.

Figure 10C:
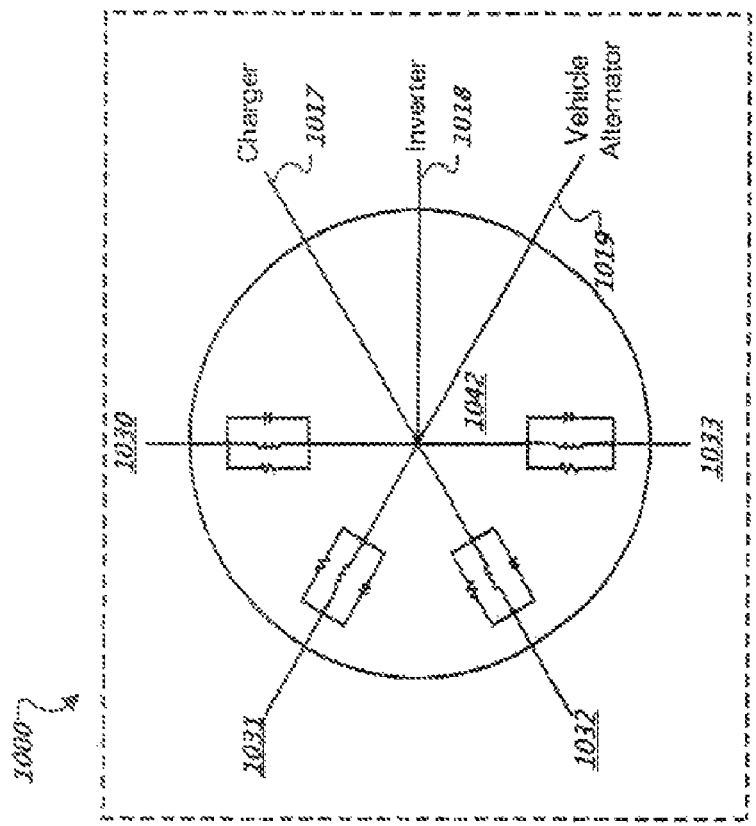
Figure 10B:
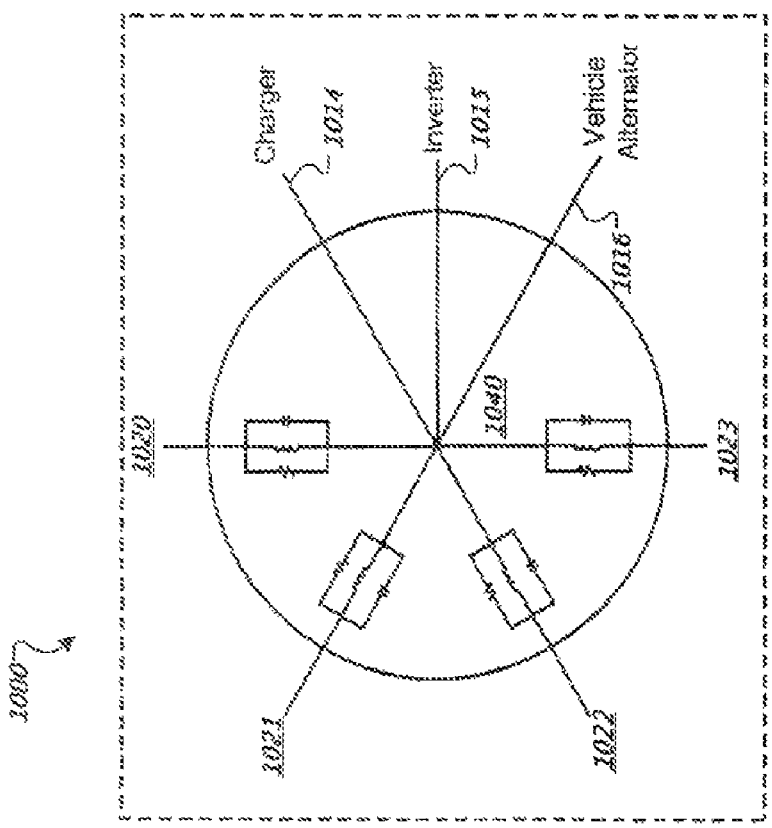

FIGS. 10A-C illustrate a circuit diagram of a system having a battery pack coupled to a automobile electrical system.

FIG. 10A is a circuit diagram of the power system.

FIG. 10B is a circuit diagram of a negative bus.

FIG. 10C is a circuit diagram of a positive bus.

Like reference symbols in the various drawings indicate like elements.

DETAILED DESCRIPTION

Figure 1A:
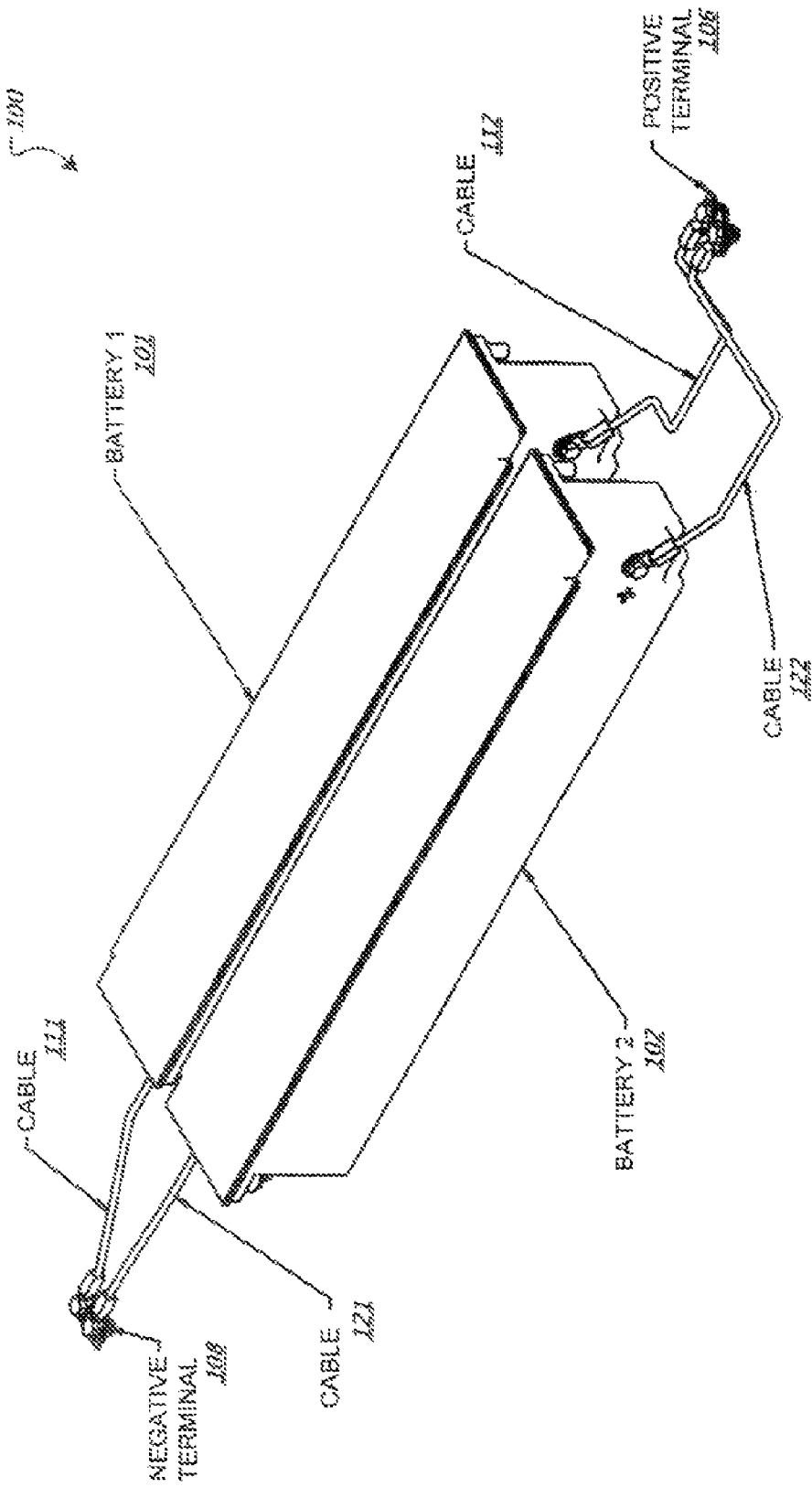
FIG. 1A shows a battery pack formed from two batteries connected in parallel using precision conductors.

FIG. 1A shows a battery pack formed from two batteries connected in parallel using precision conductors. In general, a battery pack 100 may have batteries 101, 102, a positive terminal 106, a negative terminal 108, and cables 111, 112, 121, 122. The batteries 101, 102 may supply similar voltages and currents. The cables 111, 112, 121, 122 connect the batteries 101, 102 to the terminals 106, 108 in a parallel fashion. In this embodiment, the terminals 106, 108, supply the voltage and combined current to an external device. As a result, in the embodiment depicted in FIGS. 1A-1B, a device connected to the battery pack of receives a voltage equivalent to that provided by of a single battery and a current equal to the sum of the individual battery currents. Batteries 101 and 102 have similar construction to ensure they have similar electrical characteristics. For example, the batteries 101 and 102 may use the same chemistry, have the same dimensions, etc. As a result of their similar construction, the batteries 101 and 102, have nearly identical voltage and current output curves when the same load is applied is applied to each battery.

Batteries 101 and 102 may be a common type. For instance, they may be a high performance sealed, lead acid battery. Batteries 101, 102 used in the battery pack 100, and in other embodiments, may be individual cells or batteries of cells. For example, in one instance, the batteries 101, 102 may each be a single 1.5 volt cells; in other instances, each battery may be a combination of multiple cells, such as 12 volt battery consisting of eight 1.5 volt cells connected in series. In some instances, the batteries 101, 102 may be rechargeable; in this case, the battery pack may be replenished by applying an external voltage to the battery pack terminals 106, 108. For example, if the batteries 101, 102 are of a sealed, lead acid type, such as those found in some automotive or industrial applications, the battery pack may be charged by connecting a standard battery charger to the battery pack terminals. In some preferred embodiments, the batteries employed herein are sealed lead-acid batteries such as those described in U.S. Pat. Nos. 6,074,774 and 6,027,822, which are hereby incorporated by reference in their entirety for all purposes. Batteries used herein preferably have the lowest series impedance possible for the chemistry used, with some preferred embodiments of the lead-acid batteries employed having an open circuit series impedance of 5-10 milli-ohms or less. Series impedance varies greatly among different battery designs. Other battery chemistries may be used depending on the desired applications, operating environments, and costs. For example, Ni-Cad, NiMH, Li-Polymer, or Li-Ion or any other suitable battery.

In some implementations, the cables 111, 112, 121, 122 are manufactured as identically as possible to ensure that they have similar electrical characteristics to each other within a given battery pack. In the depicted embodiment, the cables 112 and 122 have characteristics as closely as possible identical to each other. Cables 111 and 121 are similarly identical to each other, and may be identical to cables 112 and 122, ensuring similar electrical characteristics as seen by the batteries 101, 102 looking to load terminal 106. If the loads applied to the two batteries are similar and the batteries themselves are similar, the batteries are likely to drain at the same rate and retain similar voltages. As a result, the batteries tend to be drained at a similar rate without the use, in this embodiment, of any active battery management systems or other active battery management circuitry present between batteries 101, 102 and load terminal 106 and 108.

The cables 111, 112, 121, 122 are preferably precision manufactured to reduce variability. In some instances, the cables 111, 112, 121, 122 may be manufactured from the same material lots for creating a single set. For example, all the cables for a battery pack may be manufactured a single piece of cabling. Use of a single source of material used for constructing cables may reduces the likelihood of variation in electrical variation due to, for example, variations in wire looping, insulation, etc.

Figure 1B:
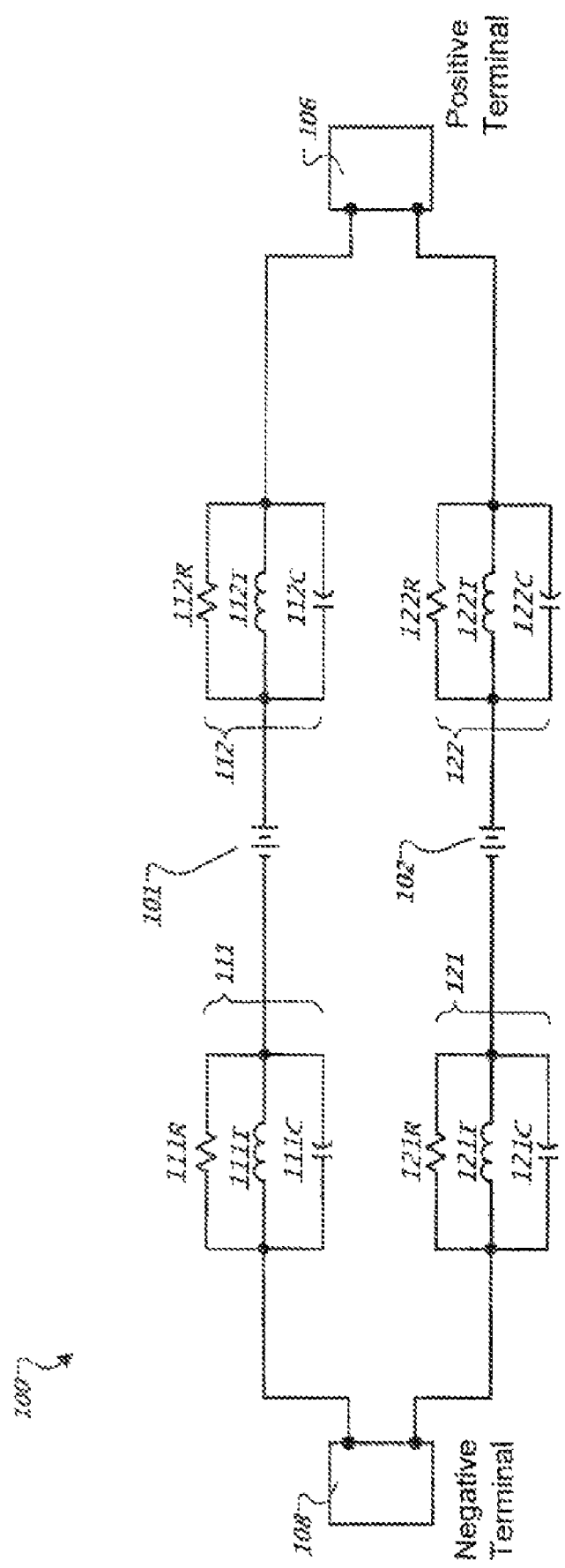
FIG. 1B is a circuit diagram of the battery pack shown in FIG. 1A.

FIG. 1B is a circuit diagram of the battery pack shown in FIG. 1A. The first cable 111, first battery 101, and second cable 112 form a parallel circuit with the third cable 121, second battery 102, and fourth cable 122. Resistance, inductance, and capacitance is modeled for each cable. For example, the first cable 111 has a corresponding resistance 111R, an inductance 111I, and a capacitance 111C. The second cable 112 has a corresponding resistance 112R, an inductance 112I, and a capacitance 112C. The third cable 121 has a corresponding resistance 121R, an inductance 121I, and a capacitance 121C. The fourth cable 122 has a corresponding resistance 122R, an inductance 122I, and a capacitance 122C.

In the depicted embodiment, the circuit branch consisting of cable 111, battery 101 and cable 112 is very similar and preferably identical to the branch consisting of cable 121, battery 102 and cable 122. The depicted cables 111, 121, 112, and 122 are preferably high power DC cables each comprising at least one high power DC precision cable segment. Such high power DC cables are preferably of the same length, material, and cross section. The resistance of the cables and connections is preferably as low as possible. Their length is preferably matched by precision measurement and cutting techniques to ensure accuracy. Further, the connections to each depicted battery terminal are also preferably identical. This may be accomplished by carefully controlled soldering techniques in the attachment of connectors, as well as selecting electrically identical washers, bolts, plugs, prongs, or other electrical fittings to ensure the electrical resistance and other characteristics are identical or, as closely as possible, similar at each respective parallel connection. Such connections create uniform parallel conductive paths from parallel-connected batteries 101 and 102 to the output terminals 108 and 106.

For example, as depicted in FIGS. 1A and 1B, there are uniform parallel conductive paths comprising, in order, as contained in this embodiment: the bolted connection from the positive terminals of batteries 101 and 102; the transitioning conductive connection from the fitting bolted to each battery terminal to the cable conductor in each of cables 112 and 122; the cables 112 and 122; the cable-to-fitting conductive connection at the positive terminal 106 end of each cable 112, 122; the fitting at such ends; and the conductive path portions of positive terminal 106 from each cable to a load connection point on the terminal. Each of these conductive portion is preferably identical or, as closely as possible, similar to its mirror image in the parallel conductive path. By "identical" it is meant, in this case, identical materials, size, shape, and electrical properties such as the identical electrical resistance, capacitance, and inductance illustrated in FIG. 1B. Where identical conductive portions are not possible or practical (such as, for example, where non-flexible conductors of different lengths are needed to span different physical distances), then the electrical properties of the conductive portions are made to be as similar as possible.

The impedance of the high-power precision DC cables, and the various connection fittings and solder connections that may be employed in construction of the implementations herein, is preferably as low as possible under existing design constraints. In one implementation, this is achieved by using fittings and busbars that are copper with silver plating, although other suitable low-resistance and low loaded-inductance connections may be used. The silver to silver connections provide low impedance and low oxidation. The surface of the connections is preferably polished and processed with an oxidation inhibitor treatment to help ensure the extremely low resistance connections retain their characteristics for as low as possible. Further, preferred cables used herein are selected to be oversized for their power load requirement in order to reduce their series resistance. For example, high power precision DC cables used herein may be selected, for example, to work under a 50-amp current load. In some implementation, high power DC cables are selected having a series resistance preferably as low as less than 2 milliohms under load. When expressed as a ratio of current to resistance (Amps/Ohms), this example provides a 50,000/1 ratio at 1 millohm, and a 25,000/1 ratio at 2 milliohms. These characteristics are plainly a high power, low resistance cable. Other lower ratios, such as 20,000, 15000, 10,000 or even 1000 or less may be considered high-power in certain applications. In embodiments using several parallel batteries, "high power" could mean that each conductive path (each battery) provides 5 amps or 1 amp, for example, depending on how many batteries are in a pack. Connectors used herein may also be oversized to reduce their equivalent series resistance and enable such large currents without excessive power dissipation.

While FIGS. 1A and 1B depict uniform parallel conductive paths comprise cables and bolted electrical fittings, other embodiment may use any suitable conductive materials and fittings to form the parallel conductive paths, provided respective parallel paths are preferably identical or, as closely as possible, similar. While precision matched-length high-power DC cables comprise the parallel conductive paths some embodiments described herein, solid busbars, traces, or other conductors may also be used if they are suitable for the power load of the desired application.

The properties achieved by employing matched precision cables may also be achieved in some embodiments by employing low resistance busbar designs. For the busbar designs, it is imperative that each busbar section is identical and dimensional equivalent providing for identical resistance, capacitance, and inductance where such equivalence is required in the circuit. Similarly, precision cables are typically cables where the resistance, capacitance, and inductance are known or equal to other precision cables of the same design and construction. The construction of a precision cable is made by manufacturing matched cable sets which are constructed from the same cable roll (lot) using copper connectors that are silvered and crimped and soldered using exactly the same process. Small variations in the manufacturing process can lead to large differences in the cables. The matched cables are bench tested for consistency (or differences) before being put into a pack construction.

Resistance, inductance and capacitance values for cable 111 are very close to corresponding values for cable 121, creating a synchronized DC environment from negative terminal 108 to the negative battery terminals of each of batteries 101 and 102. Resistance, inductance and capacitance values for cable 112 are very close to corresponding values for cable 122, thereby creating a similar synchronized or uniform DC environment from positive terminal 106 to the positive battery terminals of each of batteries 101 and 102. The batteries preferably have identical or, as closely as possible, similar electrical characteristics. As a result, power draw from the batteries is similar if a load is placed on terminals 108, 106.

Under load, battery pack 100 provides a voltage and current output from terminals 106, 108. Since the electrical characteristics of the cables and batteries are similar or identical, the battery voltages are therefore identical or, as closely as possible, similar. If the battery voltages are similar, current does not flow from one battery to the other under loaded or unloaded conditions. When a load is connected, similar current is drawn from both batteries 101, 102, causing them to be discharged at a similar rate. Such similar discharge helps maintain the matched electrical characteristics of the batteries and prevent divergence of such characteristics. Specifically, during the discharging process, the connecting circuitry preferably maintains an equal discharge current from each battery, and an equal voltage across each battery. Conversely, during the charging process, the connecting circuitry maintains an equal charge current to each battery and an equal voltage across each battery. The depicted circuit in FIG. 1B operates passively to match the DC current and voltage at the output terminals of batteries 101 and 102, which may be described as providing a synchronized DC environment Such a synchronized DC environment may be used to passively prevent divergence of battery performance characteristics, under discharge (loaded pack) and charge (charging pack) conditions. In some implementations, the battery pack 100 is rechargeable. Since the two branches of the circuit are identical or similar, half of an applied charge is deposited in each battery. While the battery pack 100 is being charged, the batteries 101, 102 may be charged at an equal or, as closely as possible, similar rate such that, at any given time, the batteries 101, 102 have approximately the same amount of stored charge, thus maintaining the similarity of their electrical characteristics such as voltage, capacity, charge acceptance rate, and temperature.

Figure 2:
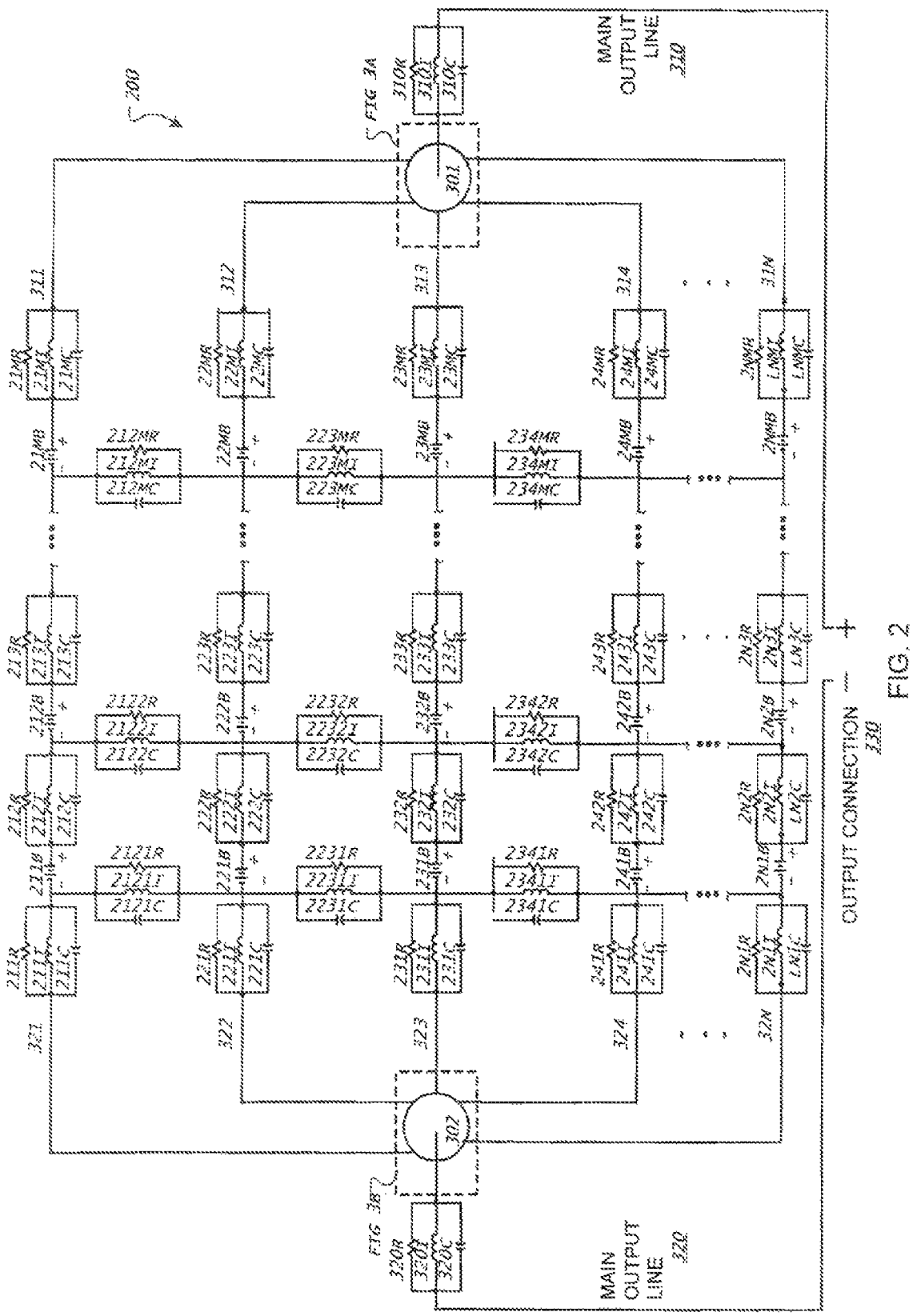
FIG. 2 is a generalized circuit diagram of a battery pack according to another implementation.
Figure 3B:
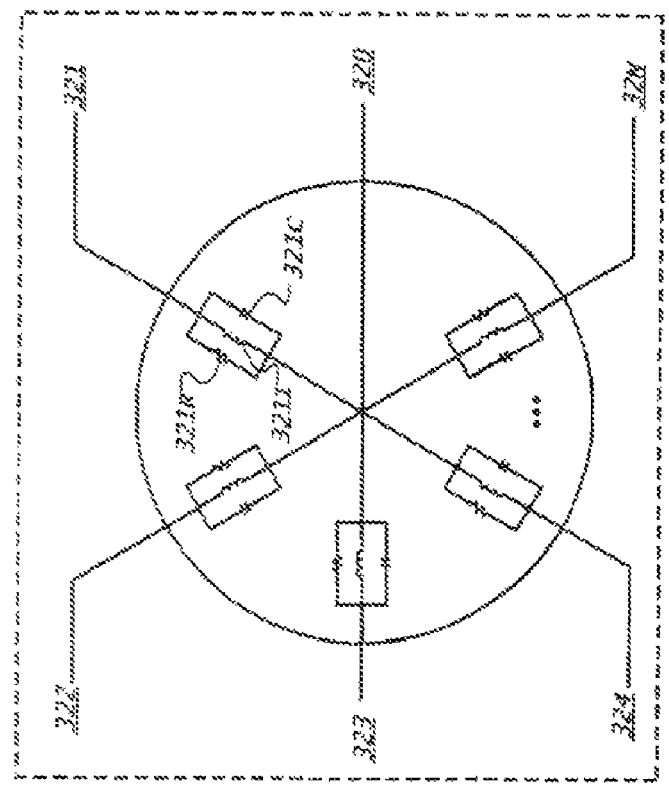
FIGS. 3A and 3B are more detailed circuit diagrams of the buses 301, 302 shown in FIG. 2.
Figure 3A:
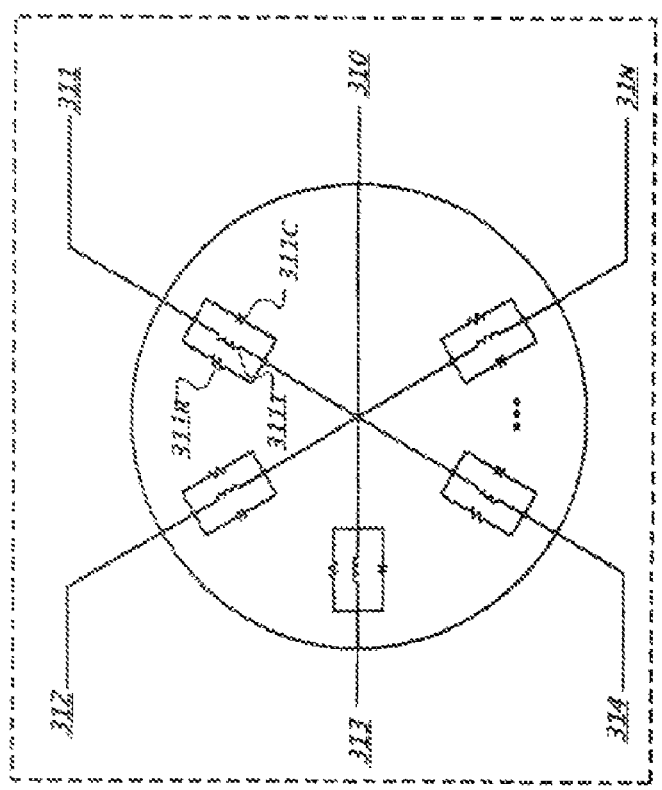

FIG. 2 is a generalized circuit diagram 200 of a battery pack according to another implementation. FIGS. 3A and 3B show elements of the circuit 200, regions 3A and 3B as marked with dotted lines in FIG. 2, in further detail. In general, circuit 200 has an array batteries 211B-2NMB connected with precision conductors each represented by a resistor, inductor and capacitor such as 211R, 211I, and 211C. The array of batteries has batteries connected in series or parallel by the precision conductors. The array may provide or store electric power via the external interface. Particularly, arrangements of the battery array and precision conductors with many parallel batteries (columns in FIG. 2) result in a battery pack with higher current capacity than a single row. Arrangements with many batteries in series (rows in FIG. 2) provide a higher voltage.

The depicted circuit 200 has an array of batteries and conductors. Reference numbers associated with elements of the array may indicate the type of the element and its position within the array. For most of the reference numbers in FIG. 2, the first digit of the reference number may indicate the figure number, the second digit may indicate a row position, and the third digit may indicate a column position with "N" and "M" corresponding to the final row or column in an array with N rows and M columns of batteries. Reference numbers ending with an "R" refer to the equivalent resistance of a conductor, reference numbers ending with an "I" refer to the equivalent inductance of a conductor, reference numbers ending with a "C" refer to the equivalent capacitance of a conductor, and reference numbers ending with a "B" refer to a battery.

The batteries in the circuit 200 should be of a similar type. For example, they should have the same chemistry and physical construction. In some implementations, the batteries may be of a standarized lead-acid type, capable of high power output. As a result of similar chemistry and construction, the batteries should have similar electrical characteristics. For instance, the batteries may provide similar currents at a similar voltage when an identical load is applied across their positive and negative terminals.

The batteries in the depicted array are connected in series using precision conductors. A set of batteries are connected in series if the positive terminal of one battery is connected to the negative terminal of another battery. The output voltage of a series circuit is equal to the sum the voltages of the batteries that are in series. For instance, the first row of the circuit 200 may consist of batteries 211B, 212B, . . . 21MB, and the voltage across the series is equal to the sum of the voltages of batteries 211B, 212B, . . . 21MB. A second row in the array may consist of batteries 221B, 222B, . . . 22MB also connected in series.

The batteries in the circuit 200 may be connected parallel using precision conductors. The current capacity of the system increases with the number of parallel branches. For example, a circuit with four parallel branches will have twice the current capacity of a circuit with two parallel branches. For instance, a first column in the depicted array consist of batteries 211B, 221B, 231B, 241B, . . . 2N1B connected in parallel; the current capacity of this portion of the circuit is equal to the sum of the currents capacity of the batteries 211B, 221B, 231B, 241B, . . . 2N1B.

Precision conductors may be modeled by a resistor, an inductor, and a capacitor. Each resistor, inductor, and capacitor in FIGS. 2 and 3A-B corresponds to the resistance, inductance, and capacitance of the electrical path, e.g. a conductor, that directly connects two elements in the circuit 200. For example, conductor 212 linking batteries 211B and 212B may be modeled by resistor 212R, inductor 212I, and capacitor 212C.

Within the circuit 200, batteries within a given column are connected in parallel. For batteries connected in parallel, it may be desirable to ensure that the current flowing through each battery is similar to ensure that the batteries have similar performance curves. For example, when a battery is discharged, its internal resistance, voltage, current capacity, etc. may change. If one battery in a parallel circuit discharges at a different rate than another battery in the same circuit, their electrical voltages may no longer match, causing a current to flow between them and reducing the amount of current available to the circuit's output. For example, if battery 211B produced a higher voltage than battery 221B, current would flow through the circuit-loop consisting of the battery 211B, conductors 212, 2122, 222, battery 221B, and conductor 2121. In addition, batteries in parallel may not charge to their full capacity if the electrical couplings between the circuit connector and each battery do not all have the same characteristics.

During the discharging process, the depicted connecting circuitry preferably maintains an equal discharge current from each battery, and an equal voltage across each battery. Conversely, during the charging process, the connecting circuitry maintains an equal charge current to each battery and an equal voltage across each battery. Further, because the battery characteristics are kept identical or as similar as possible, the charge-acceptance rates of the batteries are maintained as equal.

Combining the parallel connection scheme provided herein with low-impedance batteries and low-impedance conductors provides ability to charge and discharge at very fast rates. For example, some preferred embodiments have such low series resistance values for the entire pack that it may be charged from 30% to 85% of capacity in 15 minutes. This represents well over a C1 charge rate. Many preferred embodiments may charge at a C1 charge rate, a 2×C1 charge rate, a 3×C1 charge rate, and even a 4×C1 charge rate. Some implementations of the various pack designs herein charge at a 1000 amp maximum charge rate with 500 or 600 amps being typical. This capability comes partially from the use of low impedance batteries, combined in parallel. The parallel combination divides the series impedance of each battery (or series line of batteries) by the number of parallel connections, thus drastically reducing the series impedance of the pack and increasing the maximum charge rate. Such a maximum charge rate may be employed to implement a pulse charging scheme, for example.

In the depicted circuit 200 of this embodiment, conductors linking batteries in series within adjacent columns have identical or, as closely as possible, similar electrical characteristics. In some implementations, all the conductors linking two columns of batteries may have a nearly identical resistance. For example, the resistances 212R, 222R, . . . 2N2R of all the conductors linking the first two battery columns may be the same within 1%. For some applications, a 5% tolerance is considered acceptable, but for other applications (typically larger arrays) a 1% or 0.1% tolerance is preferred. In some implementations, all the conductors linking two columns of batteries may have a nearly identical inductance. For instance, the inductances 212I, 222I, . . . 2N2I of all the conductors linking the first two battery columns may be the same within 0.1% or less. Larger arrays of batteries preferably have smaller tolerances. For example, the array depicted in FIG. 7 preferably has a 0.1% or less tolerance. In some implementations, all the conductors linking two columns of batteries may have a nearly identical capacitance. For instance, the capacitance 212C, 222C, . . . 2N2C of all the conductors linking the first two battery columns may be the same within 1%. The similarity of impedance values may apply to operating (under load) characteristics as well as to open circuit characteristics.

In a circuit that has batteries both in series and parallel, there may be multiple, simultaneous paths for current to flow. To ensure that the batteries in the circuit 200 are drained or charged at a similar rate, it may be desirable to force the currents in each path to be similar by controlling the electrical characteristics of each conductor in the battery array such that they are identical within a small tolerance, e.g. 0.1% or 1%. For example, the resistance 212R, inductance 212I, and capacitance 212C of the conductor linking batteries 211B and 212B may be within 0.1% of the resistance 232R, inductance 232I, and capacitance 232C of the conductor linking batteries 231B and 232B.

Precision conductors may be made to have similar characteristics by tightly controlling manufacturing variation. A single batch of batch of material may used to create a matched set of conductors. In practice, the precision conductors may be wires, cables, solid conductors, etc. In some instances, a single spool of cable may be used to manufacture a set of matched conductors; for example, conductors 212, 222, 232, . . . 2N2C may all be manufactured as a batch from the same spool of cable, with the same equipment, by the same operator during the same shift.

Batteries on the vertical edges of the depicted array in FIG. 2, such as battery 211B or 21MB, may be linked to main output lines 310, 320. Conductors 311-31N link each battery 21MB-2NBM on the positive edge of the array to a positive bus 301. Conductors 321-32N link each battery 211B-2N1B on the negative edge of the array to a negative bus 302. The conductors 321-32N also have identical or, as closely as possible, similar electrical characteristics to ensure that the circuit paths between each of the batteries and busses 301, 302 are as identical as possible. The conductors 311-31N, are similarly identical to each other, and may be identical to conductors 321-32N. Similarly to the embodiment in FIG. 1B, this scheme provides for an identical or similar voltage level at the positive terminal of each battery in the top-level (highest voltage potential) column of batteries, 21MB-2NMB.

The row conductors 311-31N at the positive end of the array are each connected to positive bus 301 and thereby conductively coupled to the positive main output line 310. The row conductors 321-32N at the negative end of the array are each connected to negative bus 302 and thereby conductively coupled to negative main output 320.

FIGS. 3A and 3B are more detailed circuit diagrams of the buses 301, 302 shown in FIG. 2. The output busses 301, 302 in this embodiment are designed to have conductive paths with similar electrical characteristics as seen from the output lines 310 and 320. For example, the row conductors 311-311N are linked to the positive main output line 310 in a manner that facilitates similar conductive paths from the terminals of to the positive bus 310. In some implementations, for example, the positive row conductors 311-31N may be joined to bus 310 in a radially symmetric fashion such as being clamped to a physically disc-shaped conductor, at locations equidistant from its center, with the positive main output line 310 attached to the center. In a similar fashion, conductors 321-32N on the negative edge of the battery array may be connected via bus 302 to negative main output line 320.

The electrical characteristics of each path between the row conductors at the edge of the battery array and the main output lines 310, 320 may be modeled, as described above for the conductors linking batteries, by a resistor, an inductor, and a capacitor. As an example, the electrical characteristics in the positive bus 301 between conductor 311 and the positive main output line 310 may be modeled by a resistor 311R, an inductor 311I, and a capacitor 311C; electrical pathways between the positive line and the other conductors 312-31N may be similarly modeled. Buses which result in electrical pathways being nearly identical (e.g. within 1%), such as the configurations described above may further serve to equalize current flow through the batteries in the circuit 200.

Figure 4A:
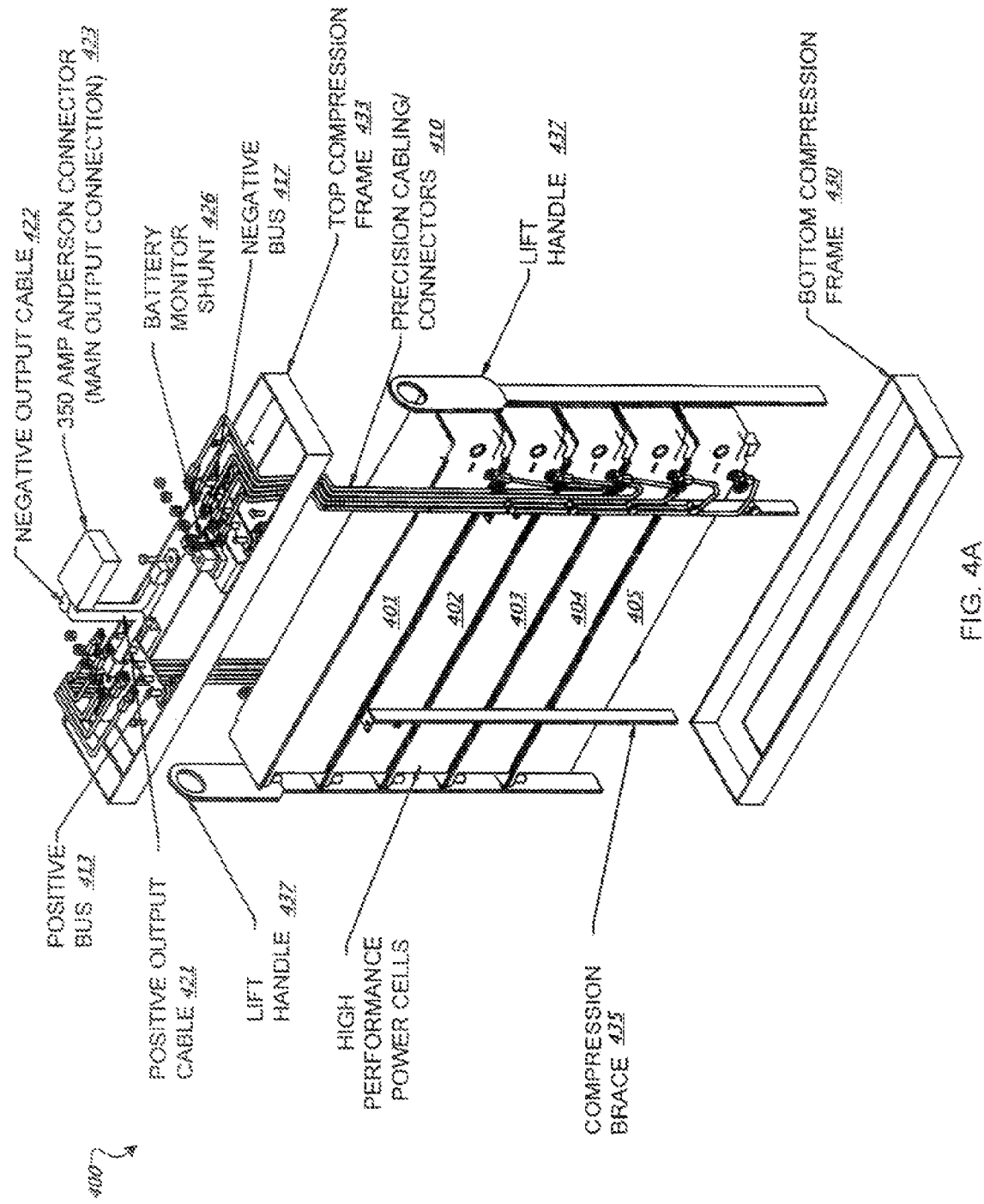
Figure 4C:
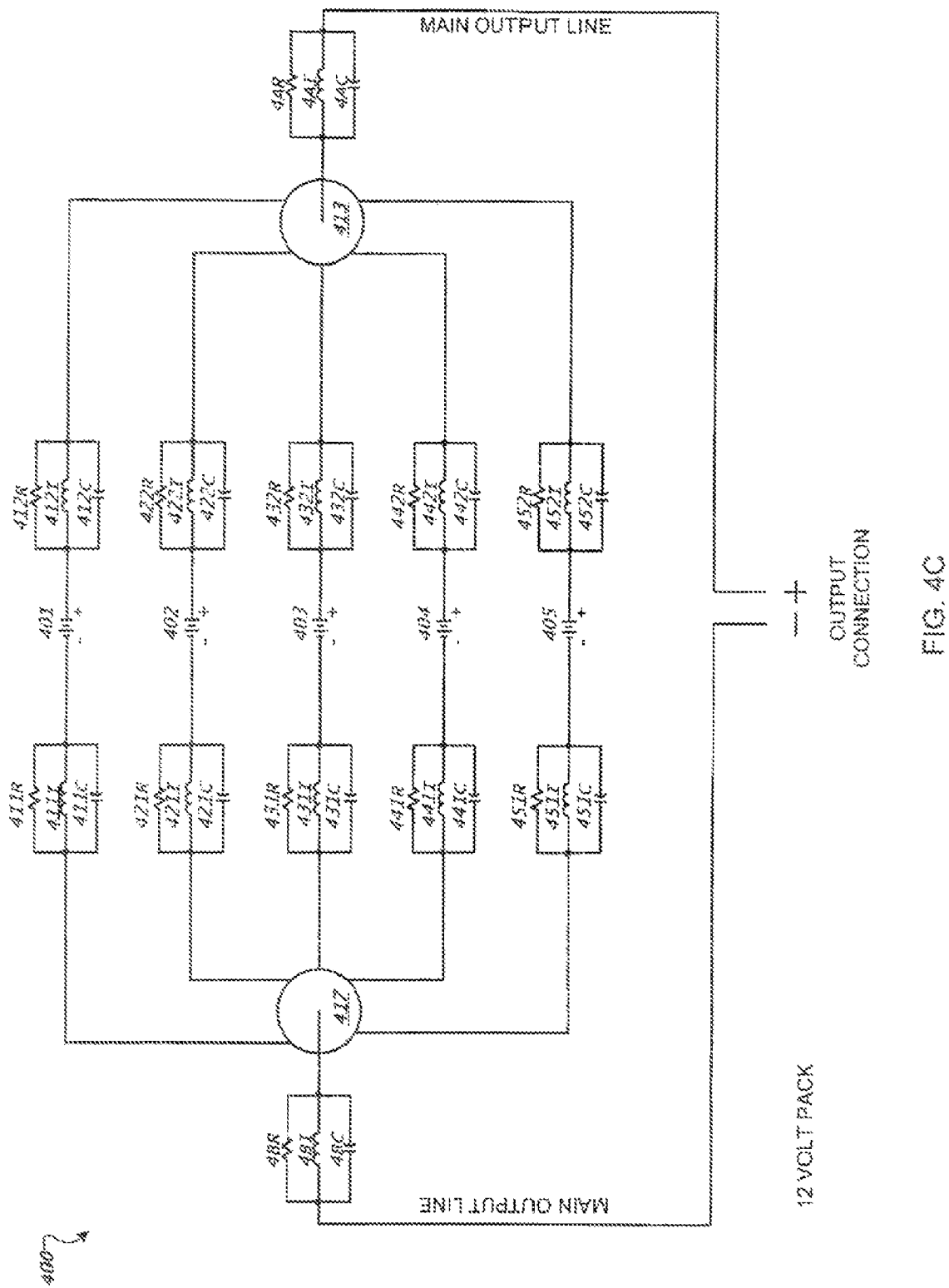

FIGS. 4A-4C show 12 volt battery pack with parallel batteries and precision conductors according to another implementation. FIG. 4A illustrates the internals of the 12 volt battery pack. FIG. 4B is a representation of the assembled 12 volt battery pack. FIG. 4C is a circuit diagram of the 12 volt battery pack.

FIG. 4A is an exploded diagram illustrating the internals of an exemplary 12V battery pack. In general, the battery pack has high-performance power cells 401-405, precision cables 410, and a frame with several parts. Power cells 401-405 are connected in parallel by precision cables 410. The precision cables carry power from the power cells to an output connector 423 which may be coupled to an external load via a power bus and attached cables. The frame holds the assembly together. This exemplar battery pack may provide high levels of current to an electric device, such as an electric fork lift.

Power cells 401-405 are connected in parallel with precision cables 410. The power cells have similar electrical characteristics, such as voltage and current output and charging curves. Precision cables 410 also have similar electrical characteristics, such as resistance, inductance, and capacitance, in order to provide a synchronized DC environment with equal voltages at each positive battery terminal as discussed herein. Precision cables 410 may be manufactured as described above to minimize the electrical differences among them. Precision cables 410 connect each of the power cells to a positive bus 413 and negative power bus 417, in parallel fashion. The power buses 416, 417 are in turn connected via a positive output cable 421 and a negative output cable 422 to a main output connector 423.

The power buses 413, 417 are designed to minimize differences in the electrical paths between the precision cables 410 and the output cable 421. Such optimization may be performed by, for example, designing the power buses with the output cable 421 in the center of the bus. Some implementations may allow the distance between the output cable 421 and the various precision cables 410 to only vary by a certain tolerance, such as 1 millohm, 10 milliohms, 50 milliohms, or 100 milliohms, for example. The depicted power busses 413 and 417 are, in this embodiment, straight busbars with the output connection made in the physical center of the busbar. Preferably, use of straight busbars (if no further parallel cabling is used in combination) is limited to bars less than 6" in length, in order to minimize parallel path length variation.

A battery monitor shunt 426 may be used to monitor current flowing through the power cells 401-405. For example, multiple shunts may be placed such the current flowing through a single power cell may be monitored. Such information that is gathered may be used, for instance, to detect asymmetries in the battery pack 400, to monitor power remaining, to aid in charging control, etc.

In some implementation, the conductors in the system, e.g. the precision cables 410, may be attached to their respective elements using bolted lugs or other mechanical connectors. In some implementations, other techniques for forming the connections, such as soldering, may be used.

A frame holds the assembly together. In the embodiment depicted in FIG. 4A, a bottom compression frame 430 is located at the lower end of the stack of power cells 401-405 and a top compression frame 433 is located at the upper end of the stack. One or more compression braces 435 may connect the top compression frame to the bottom compression frame. The compression frame thus formed may prevent the power cells 401-405 from deforming, such as may occur during charging or discharging. One possible benefit of preventing the deformation of the power cells 401-405 is to preserve the physical structure of the power cells so that electrical similarity among them is not lost. If, for example, a power cell were to significantly swell, due to instance to gasses released during charging or discharging, the inter resistance and voltage of the power cell may deviate from the other power cells in the battery pack to cause an internal current loop that depletes the stored energy and accelerates the deleterious battery divergence causing battery failure or performance degradation.

FIG. 4B shows an exterior view of the battery pack 400 embodiment depicted above in FIG. 4A. Lift handles 437 may be attached to the assembly for ease of handling or to attach the battery pack, for instance to another device being powered such as a forklift. The lift handles 437 may protrude through a cover 440 which may provide additional support or prevent unnecessary exposure of the internals of the pack.

A battery monitoring system 445 may make use of the battery monitor shunt(s) 426 to, for instance, display the remaining power level or to alert an operator of any problems.

FIG. 4C is a circuit diagram of the 12V battery pack described above. The battery pack 400 implements a version of the circuit described above in FIG. 2. In this case, a single column of five 12-volt power cells are used such that no power cells are in series (i.e. N=5, M=1).

FIGS. 5A-D illustrate a 24-volt battery pack using precision conductors. FIG. 5A illustrates the internals of the 24-volt battery pack. FIG. 5B is a detailed view of the 24-volt battery pack interconnect ladder. FIG. 5C is representation of the assembled 24-volt battery pack. FIG. 5D is a circuit diagram of the 24-volt battery pack.

FIG. 5A is an exploded diagram illustrating the internals of an exemplary 24-volt battery pack. In general, the battery pack has high-performance power cells, precision cables, and a frame. The power cells are interconnected with precision interconnect ladders. The precision cables carry power from the power cells to an to an output connector external load via a power buses and output cables. The frame holds the assembly together. The resulting battery pack may supply approximately twice the voltage and five times the current of a single 12-volt power cell.

Power cells 511-525 are capable of storing and releasing electrical energy. The power cells 511-525 all have similar electrical characteristics, such as similar voltage and current curves during charge and discharge cycles. The power cells 511-525 are electrically linked within the battery pack 500 by interconnect ladders 540 (FIG. 5B), precision cables 550, a positive power bus 560, and negative power bus 562.

In this embodiment, each power cell is connected to all other power cells via the precision interconnect ladder 540 and power buses 560, 562. Interconnect ladder 540 located on one end of battery pack 500 links power cells in each row in a serial manner. Interconnect ladder 540, along with precision cables 550 and power buses 560, 562, also link the power cells in each column in a parallel manner in locations with similar voltage potentials, thus forming a circuit similar to that depicted in FIGS. 2 and 3A-B in general (described above in further detail) and forming circuit depicted in FIG. 5D in particular.

The precision cables 550, precision interconnect ladder 540, and power buses 560, 562 preferably have uniform electrical characteristics, such as resistance, inductance, and capacitance, to ensure that the currents passing through each power cell is identical or matched as closely as possible, such as by controlling design, materials, and manufacturing (as further described herein). Precision cables 50 connect each row of the power cells to a positive bus 560 and negative power bus 562, in parallel fashion. Power buses 560 and 562 are in turn connected via a positive output cable 570 and a negative output cable 572 to a main output connector 574. The precision cables 50, precision interconnect ladder 540, and power buses 560, 562 are designed to minimize differences in the electrical paths between the precision cables 550 and the output cable. In some implementations, the distance between the output cable 521 and the various precision cables 550 may vary by less than a specified tolerance. Power busses 560 and 562 are, as discussed above, circular with terminal connections made in the center and parallel connections made along the circumference to provide matched conductive paths to the terminal connection.

While circular and straight busbars are used in some embodiments herein, other implementations may use other connection strategies to provide the desired matching parallel connections, or match is as closely as possible using that particular strategy. For example, Anderson connectors may be used, instead of a circular power bus, to couple the multiple parallel precision cables together to a common power lead.

Battery monitor shunts 580 may be used with a battery monitoring system 582 to monitor current flowing through the power cells 511-525. For example, multiple shunts may be placed such the current flowing through a single power cell may be monitored. Such information that is gathered may be used, for instance, to detect asymmetries in the battery pack 500, to monitor power remaining, to aid in charging, etc.

In some implementations, the conductors in the system, e.g. the precision cables 550, may be attached to their respective elements using bolted lugs or other mechanical connectors. In some implementations, other techniques for forming the connections, such as soldering, may be used.

A frame holds the assembly together. A bottom compression frame 590 may be located at the lower end of power cells 515-525 and a top compression frame 593 may be located at the upper end of power cells 515-525. One or more compression braces 595 may connect the top compression frame 593 to the bottom compression frame 590. The compression frame thus formed may prevent the power cells 515-525 from deforming, such as may occur during charging or discharging. Such a scheme has beneficial electrical results as described above.

FIG. 5E depicts a battery compression cage. Some implementations may employ battery compression cages for individual batteries, for reasons similar to the compression frames discussed herein. The depicted battery 5E1 in FIG. 5E may have swelling due to cycling and temperature variation. Battery compression cages 5E2 and 5E3 are bolted around the housing of battery 5E1 to form a "battery wrap" housing that mitigates swelling. While a the compression cage depicted shows two parts held together with bolts 5E4 and 5E5, other designs may be employed. While Some embodiments may compress a previously swelled battery to conform to its specification dimensions, or to more closely match such dimensions. Other embodiments may employ single-battery compression cages to prevent or reverse swelling. The cages may be added as an after-market improvement to battery cells that are purchased having an existing housing, even if such cells have a built in frame designed to stabilize the mechanical dimensions of the battery. Some implementations of battery packs may employ individual cages as depicted for all or some of the battery cells of the pack. The cages may also provide mechanical support and stability for the pack.

FIG. 5C shows additional views of the battery pack 500 described above in FIG. 5A. Lift handles 597 may be attached to the assembly for each of handling or to attach the battery pack, for instance to another device being powered such as a forklift. The lift handles 597 may protrude through a cover 598. The cover 598 may provide additional support to the assembly or prevent unnecessary exposure of the internals of the pack. A battery monitoring system 582 may make use of the battery monitor shunt(s) 580, for instance, to monitor the remaining power level.

FIG. 5D is a circuit diagram of the 24-volt battery pack described above. The battery pack 500 implements a version of the circuit described above in FIG. 2. In this case, two columns and five rows of 12-volt power cells are used (i.e. N=5, M=2). Precision cables 550 are depicted with their equivalent impedances which, as discussed, are preferably identical or as similar as possible. The depicted circuit diagram also includes equivalent impedances 5D1-4, which represent an additional, optional, busbar connected as closely as possible to the negative terminals of batteries 511-15. A similar optional busbar may be connected along the positive battery terminals (not shown). This busbar serves, in combination with precision cables 550, as another conductive assembly which may provide a uniform DC environment at the connected battery terminals.

FIGS. 6A-C illustrate a 36-volt battery pack using precision conductors. The battery pack 600 is similar to the battery pack 500 described above in FIGS. 5A-5D, with the addition of another column of power cells. Three columns of parallel 12V cells (611, 621, and 631) are connected in series to provide a 36V battery pack, as compared to the two columns of 12V cells depicted in FIGS. 5A-D. The depicted embodiment in FIGS. 6A-C also provides output busses such as negative output bus 662 arranged physically along the side of battery pack 600. An alternate design of an interconnect ladder 640 is shown in FIG. 6B. The circuit representation of battery pack 600 depicted in FIG. 6D is a particular example of the circuit shown in FIGS. 2-3B where N=6 and M=3. The equivalent circuit for battery pack 600 is shown in FIG. 6D, and shares similar matched impedances relationships in each column as previously discussed.

FIGS. 7A-D illustrate a high-power battery pack suitable for a large scale load leveling or uninterruptible power system (UPS). A load leveling system may be employed, for example, to minimize peak power demand or cost, or to provide peak power in scenariuos where the local grid capabilities are limited. A remote research station or a mission-critical factory assembly line may a UPS as a primary or secondary energy system where a power grid is not available or reliable enough to meet requirements. Such a system may also be used to provide isolation from a main power grid. In such case, power may come whole or partially from other sources, such as a battery pack or uninterruptible power system. The battery pack 700 may be beneficially employed in a UPS. In general, the battery pack 700 has power cells, a support frame, and precision conductors. Preferably, the power cells are of a uniform type with similar electrical characteristics. The precision conductors link the power cells into a grid with parallel and series portions, and link the battery pack to an external load. The frame supports the power cells and precision conductors in an organized fashion. The resulting battery pack is capable of providing and storing a large amount of electrical power.

A number of power cells 702 are arranged on a frame 704. As described above, the power cells are of a uniform nature with similar electrical characteristics. The frame has a lattice structure with horizontal and vertical dividers 706, 708 (FIG. 7B). The space bounded by the dividers 706, 708 may be used to hold power cells.

Individual power cells in the battery pack can be replaced or serviced while the unit is still operational. Such hot-swappable capability is provided because the crossbar busses redistribute the load to other batteries while a single cell is replaced. For example, if a power cell were to exhibit signs of failure, such as corrosion or leaking, it may be disconnected from the battery pack and replaced with a different one.

The enlarged drawing in FIG. 7C depicts an embodiment of a long crossbar bus 710. Such busses are used in the depicted battery pack 700 to connect all the terminals that share a similar voltage level. For example, the depicted battery pack 700 has 10 levels each with 10 batteries arranged side by side. A crossbar bus 710 connects the batteries at each level in parallel. Crossbar bus 710 is preferably made of soft copper or another suitable conductor with a low resistance (such as aluminum or copper and various alloys thereof) and has preferably equally spaced tap holes 712 for connection with bolts.

Connected along crossbar bus 710 are depicted ten shorter conductive bars 714 which implement connections between the depicted levels of power cells. In this embodiment, the power cells are batteries having battery terminals are presented on side faces of the battery housing as conductive tapped holes with a conductive facing. Conductive blocks 716 are provided with tap holes on two faces to assemble each conductive bar 714 to its crossbar bus 710 with conductive bolts 718 and washers 720 and to connect to the two batteries, between which each conductive bar 714 vertically spans, with conductive bolts 722 and washers 724.

Other suitable conductive connection schemes may be used. A limitation present in selecting such conductive connections is that the current output of a battery under operation will flow through a conductive bar 714, while only minimal current would typically flow horizontally along the length of a crossbar bus 710. This is because preferably the crossbar busses 710 are present to passively cause exact conformance of battery terminal voltage at each voltage level, so no cross current flows in ideal operation, while deviations from ideal battery convergence may cause minimal adjusting currents in crossbar busses 710. This and other similarly-configured high power busbar connection schemes may be referred to as a high-power precision DC busbar assembly.

FIGS. 7E-G depicts a circuit equivalent to the battery pack depicted in FIGS. 7A-7D. The circuit is similar to an embodiment of the circuit FIG. 2, with N=10 and M=10, but has a slightly different output connections scheme having the addition of negative output bus 726 and positive output bus 728. Referring to FIGS. 7C and 7E-G, the batteries shown in physical perspective (FIG. 7C) as the lowermost depicted row of ten batteries are represented in circuit form (FIG. 7E) as battery elements 7E1-7E10. Similarly, the physical top row of batteries in FIG. 7C is represented by circuit elements 7E11-7E20 in FIG. 7E.

The negative and positive output busbars 726 and 728 are shown as a physical busbar in FIG. 7C, and depicted as equivalent circuits in 7E-G. In this embodiment, conductive connections 7E21-30 are preferably made by conductive blocks 716, or similar pieces, coupling negative output busbar 726 to the lowermost battery row 7E1-7E10. Such conductive connections 7E21-30 are represented by their equivalent series impedances as depicted by resistor 7E31, inductor 7E32, and capacitor 7E33. As discussed herein, such parallel connections are uniform precision matched connections. It is only necessary that they are matched with each other at each voltage level (e.g. 7E21-7E30 all match) FIGS. 7F and G represent the circuit equivalent of each output busbar. The conductive sections of busbar 726 between each bolted battery connection are of identical or similar length, and therefore their circuit equivalent impedances 7F1-7F9 should be equal, or as similar as possible. The equivalents depicted for positive output busbar in FIG. 7G preferably share the same relationship.

Referring again to FIG. 7C, connected along crossbar bus 710 are depicted ten shorter conductive bars 714 which implement connections between the depicted levels of batteries. Such connections are depicted in the FIG. 7E circuit as conductors (each represented by an equivalent R, I, and C element) in the vertical column labeled 710. Each conductive bar 714 in this embodiment being a single connecting conductive piece represented in FIG. 7E by its R, I, and C equivalent, such as those labeled 7E34.

Each voltage level in the depicted pack 700 has at least one crossbar buss 710. As such, starting at the lower edge of the depicted pack in FIG. 7C, a negative output busbar 726 (detailed in FIG. 7D) connects the most negative battery terminals in pack 700 together in parallel, and is thus the lowest voltage (typically 0V) busbar of the pack 700. In a pack 700 having 12V batteries, the next higher potential busbar is a 12V crossbar buss 710 arranged across the positive terminals of the depicted lower level of ten batteries. This 12V crossbar bus is on the back side of the depicted pack 700 and is not shown (the depicted batteries have positive terminals toward the opposite longitudinal end from the negative terminals). The next crossbar bus 710 (shown in FIG. 7C as 710(1)) is at a 24V potential, and is shown conductive coupled to the positive terminals of the second-level depicted batteries and the negative terminals of the third-level depicted batteries. The connections are made similarly to raise the voltage level so that the positive output bus 728 (FIG. 7D) is at a 120V potential. The crossbar busses 710 and the conductive bars combine to serve a similar function to the interconnect ladders previously described.

FIG. 7D depicts an enlargement of the positive output bus 726, which connects to the most positive ten battery terminals in pack 700. The input and output power connections may be made to pack 700 in a variety of ways. Power may be extracted by, for example, conductively coupling a power cable to the middle of the input and output busbars. Connections to cables or other busbars may be made at the end of the output busbars 726 and 728. Such an arrangement is non-ideal, however, because it would present a non-equal DC resistance to each battery terminal from the power cable. (The conductive path is longer to the batteries on each end of pack 700). Some implementations may use an oversized busbar to minimize the DC resistance inequality. One preferred embodiment employs at least a five times capacity sized busbar, which may provide an end to end resistance within the desired system tolerance, such as, for example, below 0.5 to 0.1 milli-ohms.

FIG. 7H depicts another output connection solution. This solution connects high-power cables 7H1-10 to positive output busbar 728. The opposing end of the cables are connected to a main output line terminals 7H12, which connects to a main output line or to the power load(s), for example. Cables 7H1-10 preferably have uniform precision impedances according to the methods described herein. That is, their equivalent series impedances shown in FIG. 7H are preferably identical or as similar as possible. Negative output terminal 726 has a similar connection according to this scheme. This presents a more uniform or synchronized DC environment as seen from the load.

FIG. 8 shows an example of precision conductor configuration. In this instance, the precision conductor 800 is in a "U" shape. The precision conductor 800 has slots 806A-D to which battery terminals may be connected, such as for forming a parallel or series circuit. This style of conductor may, for example, facilitate arranging batteries in a configuration designed to fit a constrained volume or make it easier to access portion of a battery pack that are being serviced. As described above, the conductor is designed such that the electrical characteristics between any adjacent two battery terminals connected the precision conductor 800 are uniform.

FIGS. 9A-C illustrate a circuit diagram of a system for providing electric power. In general, the system 900 has a genset 902, a battery pack 906, an inverter 908, and a charger 910. A genset refers to a electrical power generator coupled with a power plant such as a gas-powered engine. In this embodiment genset 902 generates DC power for providing a portable DC power source to charge battery pack 906. In some embodiments, genset 902 also provides AC power (not shown) directly at an output on genset 902. The depicted combination may be useful for situations when a generator has either a much larger capacity than the intended load(s), and therefore fuel is wasted to continuously run the generator, or has too small a capacity for intended loads. In the latter scenario, genset 902 may be run for many hours to charge battery pack 906, which then supplies power to loads at a higher rate than the genset. The battery pack 906 may supply or store power. The inverter 908 may convert DC power provided by the genset 902 or battery pack 906 to AC power for powering external devices. The charger 910 may be used to charge the battery pack 906 from an external power source. As a result, the system 900 may provide AC power to external devices directly from the genset 902 or power stored in the battery pack 906 produced by an external source or the genset 902 during off-peak conditions.

The battery pack 906 may have a similar structure to that described above in FIGS. 2-3B. Power cells 912 are of a similar type with uniform electrical characteristics. The power cells 912 may be connected in parallel by precision conductors 910-92N to a positive terminal 940 and by precision conductors 930-93N to a negative terminal 942. The precision conductors 920-92N have uniform electrical characteristics, such as resistance, inductance, and capacitance and are modeled by the corresponding circuit elements in FIG. 9A (e.g. resistor 945, inductor 947, and capacitor 949 model precision conductor 920). Precision conductors 930-93N are similarly uniform, and are preferably uniform to conductors 920-92N.

The genset 902, inverter 908, and charger 910 are all connected in parallel with the battery pack 906 by conductors 914-919. In some embodiments, one or more of conductors 914-919 may also have uniform properties to allow parallel simultaneous operation of their connected devices without deleterious cross-currents. Further, preferred embodiments match the impedance of conductors on each side of the power components 902, 908, and 910. For example, the resistance of conductors 914 and 917 is preferably equal. The capacitance and inductance are preferably equal as well While one inverter 908 and charter 910 is shown, other embodiments may use multiple chargers or inverters, or other such components connected in parallel or series combinations. Power produced by the genset 902 may be used to charge a battery pack 906 or be converted by the inverter 908 to AC power for use by other device (not shown). In some instances, the genset 902 may run continuously, charging the battery pack 906 during times of less-than-maximum use; the battery pack 906 may then supplement the genset during time periods when power use exceeds that available from the genset 902. In some instances, the battery pack 906 may provide backup power to the inverter 908 in case the genset is unavailable due to other constraints such as maintenance, lack of fuel, environmental regulations, etc.

The charger 910 may be used to charge battery pack 902 from external electricity source. In some instances, it may be desirable or necessary to use an external electricity source such as cases where fuel for the genset 902 may be more expensive that equivalent electricity from the grid.

As with a discharge cycle, it is desirable to uniformly distribute current flowing into connected power cells during a charging cycle. Use of the above system with power cells and precision conductors that have similar electrical characteristics evens out current flowing into the power cells so that they have a similar charge and losses within the battery pack 906 due to internal currents are minimized.

The positive terminal 940 is shown in more detail in FIG. 9B and the negative terminal is shown in more detail in FIG. 9C. The figures show a circuit diagram that models characteristics of the electrical pathways 950-95N within the terminals (preferably a circular busbar), between the precision conductors 920-92N, 930-93N. As with the precision conductors, the electrical characteristics of the pathways 950-95N preferably are uniform within a specified tolerance (e.g. 1%) to ensure that current flowing to or from each power cell is uniform (see above). Such matched tolerances provide equal impedance paths to the batteries as seen from power components 902, 908, and 910.

FIGS. 10A-C illustrate a circuit diagram of a system having a battery pack coupled to a automobile electrical system. In general, the system 1000 resembles the system 900 described above in FIGS. 9A-C, but makes use of a vehicle's engine and alternator in place of a genset. Such a system 1000 may be incorporated into a vehicle, for example, such as in a contractor's truck at a construction site of a mobile home at a campground.

In general, the system 1000 has an alternator 1002, a battery pack 1006, an inverter 1008, and a charger 1010. The alternator 1002 may generate DC power when an attached engine is running. The battery pack 1006 may supply or store power. The inverter 1008 may convert DC power provided by the alternator 1002 or batter pack 1006 to AC power for powering external devices. The charger 1010 may be used to charge the battery pack 1006 from an external power source. As a result, the system 1000 may provide AC power to external devices directly from the alternator 1002 or power stored in the battery pack 1006 produced by an external source or the alternator 1002 during off-peak conditions.

The battery pack 1006 may have a similar structure to that described above in FIGS. 2-3B. Power cells 1012 are of a similar type with uniform electrical characteristics. The power cells 1012 may be connected in parallel by precision conductors 1020-1023 to a positive terminal 1040 and by precision conductors 1030-1033 to a negative terminal 1042. The precision conductors 1020-1023, 1030-1033 have uniform electrical characteristics, such as resistance, inductance, and capacitance and are modeled by the corresponding circuit elements in FIG. 9A (e.g. resistor 1045, inductor 1047, and capacitor 1049 model precision conductor 1020).

The alternator 1002, inverter 1008, and charger 1010 are all connected in parallel with the battery pack 1006 by conductors 1014-1016 and 1017-1019. These conductors may, in some embodiments, be uniform precision conductors having identical impedances to facilitate parallel operation. As discussed with regard to FIG. 9A, the conductive paths to the various attached power components are preferably matched on the positive and negative sides of each component. Power produced by the alternator 1002 may be used to charge a battery pack 1006 or be converted by the inverter 1008 to AC power for use by other devices (not shown). In some instances, the alternator 1002 may run continuously, charging the battery pack 1006 during times of less-than-maximum use; the battery pack 1006 may then supplement the genset during time periods when power use exceeds that available from the alternator 1002. In some instances, the battery pack 1006 may provide backup power to the inverter 1008 in case the genset in unavailable due to other constraints such as maintenance, lack of fuel, environmental regulations, etc. The charger 1010 may be used to charge battery pack 1002 from external electricity source. In some instances, it may be desirable or necessary to use an external electricity source such as cases where fuel for the alternator 1002 may be more expensive that equivalent electricity from the grid.

A number of embodiments of the invention have been described. Nevertheless, it will be understood that various modifications may be made, and variations on the disclosed embodiments may be provided, without departing from the spirit and scope of the invention. For example, different battery chemistries and construction materials may be used. As another example, difference circuitry may be used to practice the methods described herein. Accordingly, the following claims define the scope of the invention.

What is claimed is:

1. A battery pack capable of supplying at least 50 amps of current, the battery pack comprising:
   a positive load connection terminal; and
   multiple batteries each having an anode and a cathode, the cathodes of the batteries connected in parallel to the positive load connection terminal via respective and distinct conductive paths, each conductive path having an under-load resistance differing from an under-load resistance of each other path by less than about 1 milli-ohm;
   wherein the multiple batteries each has a similar loaded output impedance, the first conductive paths each having a loaded series impedance at least five times greater than the loaded output impedance of the multiple batteries.

2. The battery pack of claim 1 wherein the conductive paths each include a respective cable and a respective portion of a solid terminal bus connecting the cables and the load connection terminal.

3. The battery pack of claim 2 wherein the cables are attached to the terminal bus at cable terminals equally spaced from the load connection terminal.

4. The battery pack of claim 3 wherein the cable terminals are disposed on a circle having the load connection terminal coupled at its center.

5. The battery pack of claim 1 further comprising a negative terminal bus, the anodes of the multiple batteries being connected in parallel to the negative terminal bus via multiple second conducive paths all having identical electrical lengths.

6. The battery pack of claim 1 wherein the multiple batteries have resistance properties as closely as possible matching each other.

7. The battery pack of claim 1 wherein the multiple batteries have charge-acceptance properties as closely as possible matching each other.

8. The battery pack of claim 1 wherein the multiple batteries each have an impedance (under load) of less than about 50 milli-ohms.

9. The battery pack of claim 1 further comprising a positive power cable having a first end and a second end, the first end connected to the positive terminal bus such that a similar resistance may be measured from the second end of the positive power cable to the cathodes of each of the multiple batteries.

10. The battery pack of claim 9 wherein the positive terminal bus comprises a round conductive piece having a center, the positive power cable being connected to the round conductive piece at the center.

11. The battery pack of claim 1 wherein the multiple first conductive paths each comprise a precision DC cable.

12. The battery pack of claim 11 wherein the multiple first conductive paths each comprise a solder joint connecting each precision DC cable to its respective battery cathode, each of the solder joints having a solder joint resistance value precision matched to that of the other solder joint(s).

13. A battery pack comprising:
    a positive load connection terminal; and
    first multiple batteries each having an anode and a cathode, the cathodes of the first multiple batteries connected in parallel to the positive load connection terminal via respective conductive paths each including a respective high-power DC precision cable segment, each of the conductive paths having a resistance suitable to allow an average charge acceptance rate of the battery pack to be greater than a C1 charge rate.

14. The battery pack of claim 13 further comprising a second set of multiple batteries connected in parallel with each other and connected in series with the first set multiple batteries, wherein the second set of multiple batteries are connected in parallel to each other with precision conductive segments each having equal resistance.

15. The battery pack of claim 13 wherein each conductive path has a loaded impedance characteristic and a loaded amperage capacity characteristic, the ratio of the loaded amperage capacity (in amps) to the loaded impedance (in ohms) being at least 1000 to 1.

16. The battery pack of claim 13 wherein each conductive path has a loaded impedance characteristic and a desired operating amperage characteristic, the ratio of the desired operating amperage (in amps) to the loaded impedance (in ohms) being at least 1000 to 1.

17. The battery pack of claim 13 wherein each conductive path having an under-load resistance differing from an under-load resistance of each other path by less than about a 5% tolerance.

18. The power supply module of claim 13 wherein the conductive paths each have an operating resistance matched as closely as possible to an operating resistance of the other conductive paths.

19. The power supply module of claim 18 wherein the conductive paths each as an operating inductance matched as closely as possible to an operating inductance of the other conductive paths.

20. The battery pack of claim 13 wherein the conductive paths each include a respective portion of a solid terminal bus connecting the precision cable segment and the load connection terminal.

21. The battery pack of claim 20 wherein the precision cable segments are attached to the terminal bus at cable terminals equally spaced from the load connection terminal.

22. The battery pack of claim 21 wherein the cable terminals are disposed on a circle having the load connection terminal at its center.

23. The battery pack of claim 20 wherein the solid terminal bus comprises silver-plated soft copper.

24. The battery pack of claim 13 wherein the precision cable segments have matching lengths.

25. The battery pack of claim 13 herein each conductive path is capable of carrying charge current of at least 5 amps.

26. The battery pack of claim 13 wherein the precision cable segments are connected to the positive load connection terminal with precision-matched connections.

27. The battery pack of claim 26 wherein the precision-matched connections comprise low-resistance solder connections.

28. A battery pack capable of supplying at least 50 amps of current, the battery pack comprising:
    a positive load connection terminal; and
    multiple batteries each having an anode and a cathode, the cathodes of the batteries connected in parallel to the positive load connection terminal via respective and distinct conductive paths, each conductive path having an under-load resistance differing from an under-load resistance of each other path by less than about 1 milli-ohm;
    wherein the multiple first conductive paths each comprise a precision DC cable and a solder joint connecting each precision DC cable to its respective battery cathode, each of the solder joints having a solder joint resistance value precision matched to that of the other solder joint(s).

* * * * *